US011214739B2

(12) United States Patent
Quanci et al.

(10) Patent No.: US 11,214,739 B2
(45) Date of Patent: Jan. 4, 2022

(54) METHOD AND SYSTEM FOR DYNAMICALLY CHARGING A COKE OVEN

(71) Applicant: SUNCOKE TECHNOLOGY AND DEVELOPMENT LLC, Lisle, IL (US)

(72) Inventors: John Francis Quanci, Haddonfield, NJ (US); Chun Wai Choi, Chicago, IL (US); Mark Anthony Ball, Richlands, VA (US)

(73) Assignee: SUNCOKE TECHNOLOGY AND DEVELOPMENT LLC, Lisle, IL (US)

(*) Notice: Subject to any disclaimer, the term of this patent is extended or adjusted under 35 U.S.C. 154(b) by 0 days.

(21) Appl. No.: 16/735,103

(22) Filed: Jan. 6, 2020

(65) Prior Publication Data
US 2020/0231876 A1    Jul. 23, 2020

Related U.S. Application Data

(63) Continuation of application No. 15/392,942, filed on Dec. 28, 2016, now Pat. No. 10,526,542.
(Continued)

(51) Int. Cl.
C10B 31/08 (2006.01)
C10B 31/00 (2006.01)
(Continued)

(52) U.S. Cl.
CPC .............. C10B 31/08 (2013.01); C10B 31/00 (2013.01); C10B 41/005 (2013.01); B65G 21/00 (2013.01); C10B 31/04 (2013.01)

(58) Field of Classification Search
CPC ....... C10B 31/00; C10B 31/08; C10B 41/005; C10B 39/12; C10B 47/46; C10B 45/00;
(Continued)

(56) References Cited

U.S. PATENT DOCUMENTS 425,797 A    4/1890  Hunt
469,868 A    3/1892  Osbourn
(Continued)

FOREIGN PATENT DOCUMENTS

CA    1172895    8/1984
CA    2775992    5/2011
(Continued)

OTHER PUBLICATIONS

U.S. Appl. No. 16/828,448, filed Mar. 24, 2020, Quanci et al.
(Continued)

Primary Examiner — Jonathan Miller
Assistant Examiner — Gabriel E Gitman
(74) Attorney, Agent, or Firm — Perkins Coie LLP

(57) ABSTRACT

Systems and methods of dynamically charging coal in coke ovens related to the operation and output of coke plants including methods of automatically charging a coke oven using a charging ram in communication with a control system to increase the coke output and coke quality from coke plants. In some embodiments, the control system is capable of moving the charging ram in a horizontal first direction, a horizontal second direction and a vertical third direction while charging coal into the oven. In some embodiments, the coal charging system also includes a scanning system configured to scan an oven floor to generate an oven floor profile and/or oven capacity. The scanning system used in combination with the control system allows for dynamic leveling of the charging ram throughout the charging process. In some embodiments, the charging ram includes stiffener plates and support members to increase the mechanical strength of the charging ram and decrease the sag of the charging ram at a distal end.

20 Claims, 18 Drawing Sheets

Related U.S. Application Data

(60) Provisional application No. 62/271,963, filed on Dec. 28, 2015.

(51) Int. Cl.
*C10B 41/00* (2006.01)
*B65G 21/00* (2006.01)
*C10B 31/04* (2006.01)

(58) Field of Classification Search
CPC .......... C10B 31/04; B65G 21/00; B30B 1/00; B61B 3/02; B62D 65/18
See application file for complete search history.

(56) References Cited

U.S. PATENT DOCUMENTS

| | | | |
|---|---|---|---|
| 760,372 A | 5/1904 | Beam | |
| 845,719 A | 2/1907 | Schniewind | |
| 976,580 A | 7/1909 | Krause | |
| 1,140,798 A | 5/1915 | Carpenter | |
| 1,424,777 A | 8/1922 | Schondeling | |
| 1,430,027 A | 9/1922 | Plantinga | |
| 1,486,401 A | 3/1924 | Ackeren | |
| 1,530,995 A | 3/1925 | Geiger | |
| 1,572,391 A | 2/1926 | Klaiber | |
| 1,677,973 A | 7/1928 | Marquard | |
| 1,705,039 A | 3/1929 | Thornhill | |
| 1,721,813 A | 7/1929 | Geipert | |
| 1,757,682 A | 5/1930 | Palm | |
| 1,818,370 A | 8/1931 | Wine | |
| 1,818,994 A | 8/1931 | Kreisinger | |
| 1,830,951 A | 11/1931 | Lovett | |
| 1,848,818 A | 3/1932 | Becker | |
| 1,947,499 A | 2/1934 | Schrader et al. | |
| 1,955,962 A | 4/1934 | Jones | |
| 1,979,507 A * | 11/1934 | Underwood | C10B 33/10 414/215 |
| 2,075,337 A | 3/1937 | Burnaugh | |
| 2,141,035 A | 12/1938 | Daniels | |
| 2,195,466 A | 4/1940 | Otto | |
| 2,235,970 A | 3/1941 | Wilputte | |
| 2,340,283 A | 1/1944 | Vladu | |
| 2,340,981 A | 2/1944 | Otto | |
| 2,394,173 A | 2/1946 | Harris et al. | |
| 2,424,012 A | 7/1947 | Bangham et al. | |
| 2,486,199 A | 10/1949 | Nier | |
| 2,609,948 A | 9/1952 | Laveley | |
| 2,641,575 A | 6/1953 | Otto | |
| 2,649,978 A * | 8/1953 | Smith | B65G 69/0408 414/180 |
| 2,667,185 A | 1/1954 | Beavers | |
| 2,723,725 A | 11/1955 | Keiffer | |
| 2,756,842 A | 7/1956 | Chamberlin et al. | |
| 2,813,708 A | 11/1957 | Frey | |
| 2,827,424 A | 3/1958 | Homan | |
| 2,873,816 A | 2/1959 | Emil et al. | |
| 2,902,991 A | 9/1959 | Whitman | |
| 2,907,698 A | 10/1959 | Schulz | |
| 3,015,893 A | 1/1962 | McCreary | |
| 3,026,715 A | 3/1962 | Briggs | |
| 3,033,764 A | 5/1962 | Hannes | |
| 3,175,961 A | 3/1965 | Samson | |
| 3,224,805 A | 12/1965 | Clyatt | |
| 3,259,551 A | 7/1966 | Thompson | |
| 3,327,521 A | 6/1967 | Briggs | |
| 3,342,990 A | 9/1967 | Barrington et al. | |
| 3,448,012 A | 6/1969 | Allred | |
| 3,462,345 A | 8/1969 | Kernan | |
| 3,511,030 A | 5/1970 | Brown et al. | |
| 3,542,650 A | 11/1970 | Kulakov | |
| 3,545,470 A | 12/1970 | Paton | |
| 3,587,198 A | 6/1971 | Hensel | |
| 3,591,827 A | 7/1971 | Hall | |
| 3,592,742 A | 7/1971 | Thompson | |
| 3,616,408 A | 10/1971 | Hickam | |
| 3,623,511 A | 11/1971 | Levin | |
| 3,630,852 A | 12/1971 | Nashan et al. | |
| 3,652,403 A | 3/1972 | Knappstein et al. | |
| 3,676,305 A | 7/1972 | Cremer | |
| 3,709,794 A | 1/1973 | Kinzler et al. | |
| 3,710,551 A | 1/1973 | Sved | |
| 3,746,626 A | 7/1973 | Morrison, Jr. | |
| 3,748,235 A | 7/1973 | Pries | |
| 3,784,034 A | 1/1974 | Thompson | |
| 3,806,032 A | 4/1974 | Pries | |
| 3,811,572 A | 5/1974 | Tatterson | |
| 3,836,161 A | 10/1974 | Pries | |
| 3,839,156 A | 10/1974 | Jakobie et al. | |
| 3,844,900 A | 10/1974 | Schulte | |
| 3,857,758 A | 12/1974 | Mole | |
| 3,875,016 A | 4/1975 | Schmidt-Balve | |
| 3,876,143 A | 4/1975 | Rossow et al. | |
| 3,876,506 A | 4/1975 | Dix et al. | |
| 3,878,053 A | 4/1975 | Hyde | |
| 3,894,302 A | 7/1975 | Lasater | |
| 3,897,312 A * | 7/1975 | Armour | C10B 31/08 202/262 |
| 3,906,992 A | 9/1975 | Leach | |
| 3,912,091 A | 10/1975 | Thompson | |
| 3,912,597 A | 10/1975 | MacDonald | |
| 3,917,458 A | 11/1975 | Polak | |
| 3,928,144 A | 12/1975 | Jakimowicz | |
| 3,930,961 A | 1/1976 | Sustarsic et al. | |
| 3,933,443 A | 1/1976 | Lohrmann | |
| 3,957,591 A | 5/1976 | Riecker | |
| 3,959,084 A | 5/1976 | Price | |
| 3,963,582 A | 6/1976 | Helm et al. | |
| 3,969,191 A | 7/1976 | Bollenbach | |
| 3,975,148 A | 8/1976 | Fukuda et al. | |
| 3,979,870 A | 9/1976 | Moore | |
| 3,984,289 A | 10/1976 | Sustarsic et al. | |
| 3,990,948 A | 11/1976 | Lindgren | |
| 4,004,702 A | 1/1977 | Szendroi | |
| 4,004,983 A | 1/1977 | Pries | |
| 4,025,395 A | 5/1977 | Ekholm et al. | |
| 4,040,910 A | 8/1977 | Knappstein et al. | |
| 4,045,056 A | 8/1977 | Kandakov et al. | |
| 4,045,299 A | 8/1977 | McDonald | |
| 4,059,885 A | 11/1977 | Oldengott | |
| 4,065,059 A | 12/1977 | Jablin | |
| 4,067,462 A | 1/1978 | Thompson | |
| 4,077,848 A | 3/1978 | Grainer et al. | |
| 4,083,753 A | 4/1978 | Rogers et al. | |
| 4,086,231 A | 4/1978 | Ikio | |
| 4,093,245 A | 6/1978 | Connor | |
| 4,100,033 A | 7/1978 | Holter | |
| 4,100,491 A | 7/1978 | Newman, Jr. et al. | |
| 4,111,757 A | 9/1978 | Carimboli | |
| 4,124,450 A | 11/1978 | MacDonald | |
| 4,133,720 A | 1/1979 | Franzer et al. | |
| 4,135,948 A | 1/1979 | Mertens et al. | |
| 4,141,796 A | 2/1979 | Clark et al. | |
| 4,143,104 A | 3/1979 | Konijnenburg et al. | |
| 4,145,195 A | 3/1979 | Knappstein et al. | |
| 4,147,230 A | 4/1979 | Ormond et al. | |
| 4,162,546 A | 7/1979 | Shortell et al. | |
| 4,181,459 A * | 1/1980 | Price | C10B 31/04 198/502.2 |
| 4,189,272 A | 2/1980 | Gregor et al. | |
| 4,194,951 A | 3/1980 | Pries | |
| 4,196,053 A | 4/1980 | Grohmann | |
| 4,211,608 A | 7/1980 | Kwasnoski et al. | |
| 4,211,611 A | 7/1980 | Bocsanczy | |
| 4,213,489 A | 7/1980 | Cain | |
| 4,213,828 A | 7/1980 | Calderon | |
| 4,222,748 A | 9/1980 | Argo et al. | |
| 4,222,824 A | 9/1980 | Flockenhaus et al. | |
| 4,224,109 A | 9/1980 | Flockenhaus et al. | |
| 4,225,393 A | 9/1980 | Gregor et al. | |
| 4,226,113 A | 10/1980 | Pelletier et al. | |
| 4,230,498 A | 10/1980 | Ruecki | |
| 4,235,830 A | 11/1980 | Bennett et al. | |
| 4,239,602 A | 12/1980 | La Bate | |

(56) References Cited

U.S. PATENT DOCUMENTS

| | | |
|---|---|---|
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,324,568 A | 4/1982 | Wilcox et al. |
| 4,330,372 A | 5/1982 | Cairns et al. |
| 4,334,963 A | 6/1982 | Stog |
| 4,336,107 A * | 6/1982 | Irwin .................. C10B 41/02 202/239 |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A * | 3/1983 | Hara .................. C10B 37/04 202/239 |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,445,977 A | 5/1984 | Husher |
| 4,446,018 A | 5/1984 | Cerwick |
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,518,461 A | 5/1985 | Gelfand |
| 4,527,488 A | 7/1985 | Lindgren |
| 4,564,420 A | 1/1986 | Spindeler et al. |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,749,446 A | 6/1988 | van Laar et al. |
| 4,793,981 A | 12/1988 | Doyle et al. |
| 4,824,614 A | 4/1989 | Jones et al. |
| 4,889,698 A | 12/1989 | Moller et al. |
| 4,898,021 A | 2/1990 | Weaver et al. |
| 4,918,975 A | 4/1990 | Voss |
| 4,919,170 A | 4/1990 | Kallinich et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,398,543 A | 3/1995 | Fukushima et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,597,452 A | 1/1997 | Hippe et al. |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,715,962 A | 2/1998 | McDonnell |
| 5,720,855 A | 2/1998 | Baird |
| 5,752,548 A | 5/1998 | Matsumoto et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A * | 12/1999 | Naito .................. C10B 41/00 348/83 |
| 6,017,214 A | 1/2000 | Sturgulewski |
| 6,059,932 A * | 5/2000 | Sturgulewski .......... C10B 15/02 201/40 |
| 6,139,692 A | 10/2000 | Tamura et al. |
| 6,152,668 A | 11/2000 | Knoch |
| 6,156,688 A | 12/2000 | Ando et al. |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,539,602 B1 | 4/2003 | Ozawa et al. |
| 6,596,128 B2 | 7/2003 | Westbrook |
| 6,626,984 B1 | 9/2003 | Taylor |
| 6,699,035 B2 | 3/2004 | Brooker |
| 6,712,576 B2 * | 3/2004 | Skarzenski .......... C03B 3/00 414/157 |
| 6,758,875 B2 | 7/2004 | Reid et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,547,377 B2 | 6/2009 | Inamasu et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |

(56) References Cited

U.S. PATENT DOCUMENTS

| | | |
|---|---|---|
| 8,146,376 B1 | 4/2012 | Williams et al. |
| 8,152,970 B2 | 4/2012 | Barkdoll et al. |
| 8,236,142 B2 | 8/2012 | Westbrook |
| 8,266,853 B2 | 9/2012 | Bloom et al. |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,568,568 B2* | 10/2013 | Schuecker ............. C10B 37/02 201/1 |
| 8,640,635 B2 | 2/2014 | Bloom et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,193,915 B2 | 11/2015 | West et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,359,554 B2 | 6/2016 | Quanci et al. |
| 9,404,043 B2 | 8/2016 | Kim |
| 9,498,786 B2 | 11/2016 | Pearson |
| 9,580,656 B2 | 2/2017 | Quanci et al. |
| 9,672,499 B2 | 6/2017 | Quanci et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,526,541 B2 | 1/2020 | West et al. |
| 10,578,521 B1 | 3/2020 | Dinakaran et al. |
| 10,732,621 B2 | 8/2020 | Celia et al. |
| 10,877,007 B2 | 12/2020 | Steele et al. |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2004/0220840 A1 | 11/2004 | Bonissone et al. |
| 2005/0087767 A1 | 4/2005 | Fitzgerald et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 | 5/2007 | Inamasu et al. |
| 2007/0116619 A1 | 5/2007 | Taylor et al. |
| 2007/0251198 A1 | 11/2007 | Witter |
| 2007/0289861 A1* | 12/2007 | Barkdoll ................. C10B 31/10 201/8 |
| 2008/0028935 A1 | 2/2008 | Andersson |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0181297 A1 | 7/2010 | Whysail |
| 2010/0196597 A1 | 8/2010 | Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0120852 A1 | 5/2011 | Kim |
| 2011/0144406 A1 | 6/2011 | Masatsugu et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0024688 A1 | 2/2012 | Barkdoll |
| 2012/0030998 A1 | 2/2012 | Barkdoll et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0180133 A1 | 7/2012 | Ai-Harbi et al. |
| 2012/0228115 A1 | 9/2012 | Westbrook |
| 2012/0247939 A1 | 10/2012 | Kim et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0213114 A1 | 8/2013 | Wetzig et al. |
| 2013/0216717 A1 | 8/2013 | Rago et al. |
| 2013/0220373 A1 | 8/2013 | Kim |
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0061018 A1 | 3/2014 | Sarpen et al. |
| 2014/0083836 A1 | 3/2014 | Quanci et al. |
| 2014/0182195 A1 | 7/2014 | Quanci et al. |
| 2014/0182683 A1 | 7/2014 | Quanci et al. |
| 2014/0183023 A1 | 7/2014 | Quanci et al. |
| 2014/0208997 A1 | 7/2014 | Alferyev et al. |
| 2014/0224123 A1 | 8/2014 | Walters |
| 2014/0262139 A1 | 9/2014 | Choi et al. |
| 2014/0262726 A1 | 9/2014 | West et al. |
| 2015/0122629 A1 | 5/2015 | Freimuth et al. |
| 2015/0143908 A1 | 5/2015 | Cetinkaya |
| 2015/0175433 A1 | 6/2015 | Micka et al. |
| 2015/0219530 A1 | 8/2015 | Li et al. |
| 2015/0247092 A1 | 9/2015 | Quanci et al. |
| 2015/0361346 A1 | 12/2015 | West et al. |
| 2015/0361347 A1 | 12/2015 | Ball et al. |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1 | 6/2016 | Kato et al. |
| 2016/0186063 A1 | 6/2016 | Quanci et al. |
| 2016/0186064 A1 | 6/2016 | Quanci et al. |
| 2016/0186065 A1 | 6/2016 | Quanci et al. |
| 2016/0222297 A1 | 8/2016 | Choi et al. |
| 2016/0319197 A1 | 11/2016 | Quanci et al. |
| 2016/0319198 A1 | 11/2016 | Quanci et al. |
| 2017/0015908 A1 | 1/2017 | Quanci et al. |
| 2017/0182447 A1 | 6/2017 | Sappok et al. |
| 2017/0183569 A1 | 6/2017 | Quanci et al. |
| 2017/0253803 A1 | 9/2017 | West et al. |
| 2017/0261417 A1 | 9/2017 | Zhang |
| 2017/0313943 A1 | 11/2017 | Valdevies |
| 2017/0352243 A1 | 12/2017 | Quanci et al. |
| 2018/0340122 A1 | 11/2018 | Crum et al. |
| 2019/0099708 A1 | 4/2019 | Quanci |
| 2019/0161682 A1 | 5/2019 | Quanci et al. |
| 2019/0169503 A1 | 6/2019 | Chun et al. |

(56) References Cited

U.S. PATENT DOCUMENTS

| | | | |
|---|---|---|---|
| 2019/0317167 | A1 | 10/2019 | LaBorde et al. |
| 2019/0352568 | A1 | 11/2019 | Quanci et al. |
| 2020/0071190 | A1 | 3/2020 | Wiederin et al. |
| 2020/0139273 | A1 | 5/2020 | Badiei |
| 2020/0173679 | A1 | 6/2020 | O'Reilly et al. |
| 2021/0130697 | A1 | 5/2021 | Quanci et al. |
| 2021/0163821 | A1 | 6/2021 | Quanci et al. |
| 2021/0163822 | A1 | 6/2021 | Quanci et al. |
| 2021/0163823 | A1 | 6/2021 | Quanci et al. |
| 2021/0198579 | A1 | 7/2021 | Quanci et al. |

FOREIGN PATENT DOCUMENTS

| | | |
|---|---|---|
| CA | 2822841 | 7/2012 |
| CA | 2822857 | 7/2012 |
| CA | 2905110 A1 | 9/2014 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 201121178 Y | 9/2008 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 101910530 A | 12/2010 |
| CN | 102072829 A | 5/2011 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 202470353 U | 10/2012 |
| CN | 103399536 A | 11/2013 |
| CN | 103468289 A | 12/2013 |
| CN | 103913193 A | 7/2014 |
| CN | 203981700 U | 12/2014 |
| CN | 105137947 A | 12/2015 |
| CN | 105189704 A | 12/2015 |
| CN | 105264448 A | 1/2016 |
| CN | 105467949 A | 4/2016 |
| CN | 106661456 A | 5/2017 |
| CN | 106687564 A | 5/2017 |
| CN | 107445633 A | 12/2017 |
| CN | 100500619 C | 6/2020 |
| DE | 201729 C | 9/1908 |
| DE | 212176 | 7/1909 |
| DE | 1212037 B | 3/1966 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EP | 0126399 A1 | 11/1984 |
| EP | 0208490 | 1/1987 |
| EP | 0903393 A2 | 3/1999 |
| EP | 1538503 A1 | 6/2005 |
| EP | 2295129 | 3/2011 |
| EP | 2468837 A1 | 6/2012 |
| FR | 2339664 | 8/1977 |
| FR | 2517802 | 6/1983 |
| FR | 2764978 | 12/1998 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 871094 | 6/1961 |
| GB | 923205 A | 5/1963 |
| JP | S50148405 | 11/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | 07188668 | 7/1995 |
| JP | 07216357 | 8/1995 |
| JP | H07204432 | 8/1995 |
| JP | H08104875 A | 4/1996 |
| JP | 08127778 | 5/1996 |
| JP | H10273672 A | 10/1998 |
| JP | H11-131074 | 5/1999 |
| JP | H11256166 A | 9/1999 |
| JP | 2000204373 A | 7/2000 |
| JP | 2000219883 A | 8/2000 |
| JP | 2001055576 A | 2/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003071313 A | 3/2003 |
| JP | 2003292968 A | 10/2003 |
| JP | 2003342581 A | 12/2003 |
| JP | 2004169016 A | 6/2004 |
| JP | 2005503448 A | 2/2005 |
| JP | 2005135422 A | 5/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 4101226 B2 | 6/2008 |
| JP | 2008231278 A | 10/2008 |

(56) References Cited

FOREIGN PATENT DOCUMENTS

| | | |
|---|---|---|
| JP | 2009019106 A | 1/2009 |
| JP | 2009073864 A | 4/2009 |
| JP | 2009073865 A | 4/2009 |
| JP | 2009135276 A | 6/2009 |
| JP | 2009144121 | 7/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012102302 | 5/2012 |
| JP | 2013006957 A | 1/2013 |
| JP | 2013510910 | 3/2013 |
| JP | 2013189322 A | 9/2013 |
| JP | 2014040502 A | 3/2014 |
| JP | 2015094091 A | 5/2015 |
| JP | 2016169897 A | 9/2016 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030012458 A | 2/2003 |
| KR | 20040107204 A | 12/2004 |
| KR | 1020050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20150011084 A | 1/2015 |
| KR | 20170038102 A | 4/2017 |
| KR | 20170058808 A | 5/2017 |
| KR | 20170103857 A | 9/2017 |
| KR | 101862491 B1 | 5/2018 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2005023649 | 3/2005 |
| WO | WO2005031297 | 4/2005 |
| WO | WO2005115583 | 12/2005 |
| WO | WO2007103649 | 9/2007 |
| WO | WO2008034424 | 3/2008 |
| WO | WO2008105269 | 9/2008 |
| WO | WO2011000447 | 1/2011 |
| WO | WO2011126043 | 10/2011 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |
| WO | WO2016086322 | 6/2016 |

OTHER PUBLICATIONS

U.S. Appl. No. 16/845,530, filed Apr. 10, 2020, Quanci et al.
U.S. Appl. No. 16/897,957, filed Jun. 10, 2020, Ball et al.
U.S. Appl. No. 17/076,563, filed Oct. 21, 2020, Crum et al.
India First Examination Report in Application No. 201817024455; dated Oct. 14, 2020; 7 pages.
Japanese Notice of Rejection for Japanese Application No. 2018-533903; dated Oct. 6, 2020; 14 pages.
Russian Office Action for Russian Application No. 2018123311/05 (036939); dated Feb. 12, 2020; 9 pages.
U.S. Appl. No. 16/428,014, filed May 31, 2019, Quanci et al.
U.S. Appl. No. 16/704,689, filed Dec. 5, 2019, West et al.
U.S. Appl. No. 16/729,036, filed Dec. 27, 2019, Quanci et at.
U.S. Appl. No. 16/729,053, filed Dec. 5, 2019, Quanci et at.
U.S. Appl. No. 16/729,057, filed Dec. 5, 2019, Quanci et at.
U.S. Appl. No. 16/729,068, filed Dec. 5, 2019, Quanci et at.
U.S. Appl. No. 16/729,122, filed Dec. 5, 2019, Quanci et at.
U.S. Appl. No. 16/729,129, filed Dec. 5, 2019, Quanci et at.
U.S. Appl. No. 16/729,157, filed Dec. 5, 2019, Quanci et at.
U.S. Appl. No. 16/729,170, filed Dec. 5, 2019, Quanci et at.
U.S. Appl. No. 16/729,201, filed Dec. 5, 2019, Quanci et at.
U.S. Appl. No. 16/729,212, filed Dec. 5, 2019, Quanci et at.
U.S. Appl. No. 16/729,219, filed Dec. 5, 2019, Quanci et at.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf; 404 pages.
Basset et al., "Calculation of steady flow pressure loss coefficients for pipe junctions," Proc Instn Mech Engrs., vol. 215, Part C, p. 861-881 IMechIE2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
Industrial Furnace Design Handbook, Editor-in-Chief: First Design Institute of First Ministry of Machinery Industry, Beijing: Mechanical Industry Press, pp. 180-183, Oct. 1981.
Joseph, B., "A tutorial on inferential control and its applications," Proceedings of the 1999 American Control Conference (Cat. No. 99CH36251), San Diego, CA, 1999, pp. 3106-3118 vol. 5.
JP 03-197588, Inoue Keizo et al., Method and Equipment For Boring Degassing Hole in Coal Charge in Coke Oven, Japanese Patent (Abstract Only) Aug. 28, 1991.
JP 04-159392, Inoue Keizo et al., Method and Equipment For Opening Hole For Degassing of Coal Charge in Coke Oven, Japanese Patent (Abstract Only) Jun. 2, 1992.

(56) References Cited

OTHER PUBLICATIONS

Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.

Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.

Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173, 184.

Madias, et al., "A review on stamped charging of coals" (2013). Available at https://www.researchgate.net/publication/263887759_A_review_on_stamped_charging_of_coals.

Metallurgical Coke MSDS, ArcelorMittal, May 30, 2011, available online at http://dofasco.arcelormittal.com/-/media/Files/A/Arcelormittal-Canada/material-safety/metallurgical-coke.pdf.

"Middletown Coke Company HRSG Maintenance BACT Analysis Option 1—Individual Spray Quenches Sun Heat Recovery Coke Facility Process Flow Diagram Middletown Coke Company 100 Oven Case #1—24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.

Practical Technical Manual of Refractories, Baoyu Hu, etc., Beijing: Metallurgical Industry Press, Chapter 6; 2004, 6-30.

Refractories for Ironmaking and Steelmaking: A History of Battles over High Temperatures; Kyoshi Sugita (Japan, Shaolin Zhang), 1995, p. 160, 2004, 2-29.

Rose, Harold J., "The Selection of Coals for the Manufacture of Coke," American Institute of Mining and Metallurgical Engineers, Feb. 1926, 8 pages.

Waddell, et al., "Heat-Recovery Cokemaking Presentation," Jan. 1999, pp. 1-25.

Walker D N et al, "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.

Westbrook, "Heat-Recovery Cokemaking at Sun Coke," AISE Steel Technology, Pittsburg, PA, vol. 76, No. 1, Jan. 1999, pp. 25-28.

"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.

Yu et al., "Coke Oven Production Technology," Lianoning Science and Technology Press, first edition, Apr. 2014, pp. 356-358.

"Resources and Utilization of Coking Coal in China," Mingxin Shen ed., Chemical Industry Press, first edition, Jan. 2007, pp. 242-243, 247.

Australian Examination Report No. 1 for Australian Application No. 2016382975; dated Sep. 27, 2018; 8 pages.

Colombian Office Action for Colombian Application No. NC2018/0006493; dated Jan. 16, 2020; 13 pages.

Extended Search Report for European Application No. 16882600.6; dated Jul. 19, 2019; 8 pages.

International Search Report and Written Opinion for PCT/US2016/068996; dated Apr. 10, 2017, 28 pages.

U.S. Appl. No. 17/155,818, filed Jan. 22, 2021, Choi et al.
U.S. Appl. No. 17/190,720, filed Mar. 3, 2021, West et al.
U.S. Appl. No. 17/191,119, filed Mar. 3, 2021, Quanci et al.
U.S. Appl. No. 17/222,886, filed Apr. 5, 2021, Quanci et al.
U.S. Appl. No. 17/228,469, filed Apr. 12, 2021, Quanci et al.
U.S. Appl. No. 17/228,501, filed Apr. 12, 2021, Quanci et al.
U.S. Appl. No. 17/306,895, filed May 3, 2021, Quanci et al.
U.S. Appl. No. 17/321,857, filed May 17, 2021, Quanci et al.
U.S. Appl. No. 17/320,343, filed May 24, 2021, Quanci et al.

Australian Examination Report No. 1 for Australian Application No. 2019236748; dated Nov. 23, 2020; 5 pages.

Canadian Office Action in Canadian Application No. 3,009,822; dated Apr. 7, 2021; 3 pages.

Japanese Notice of Rejection for Japanese Application No. 2018-533903; dated Apr. 13, 2021; 4 pages.

\* cited by examiner

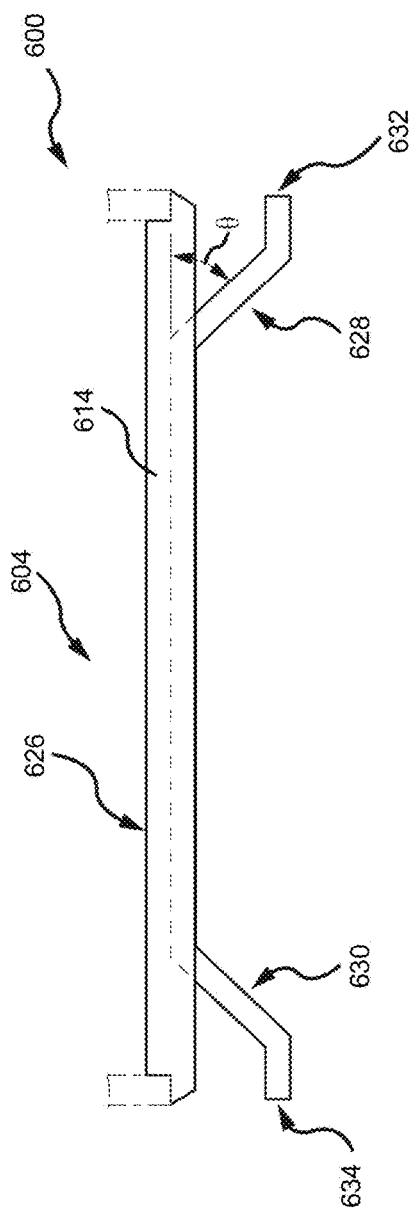
FIG. 13A
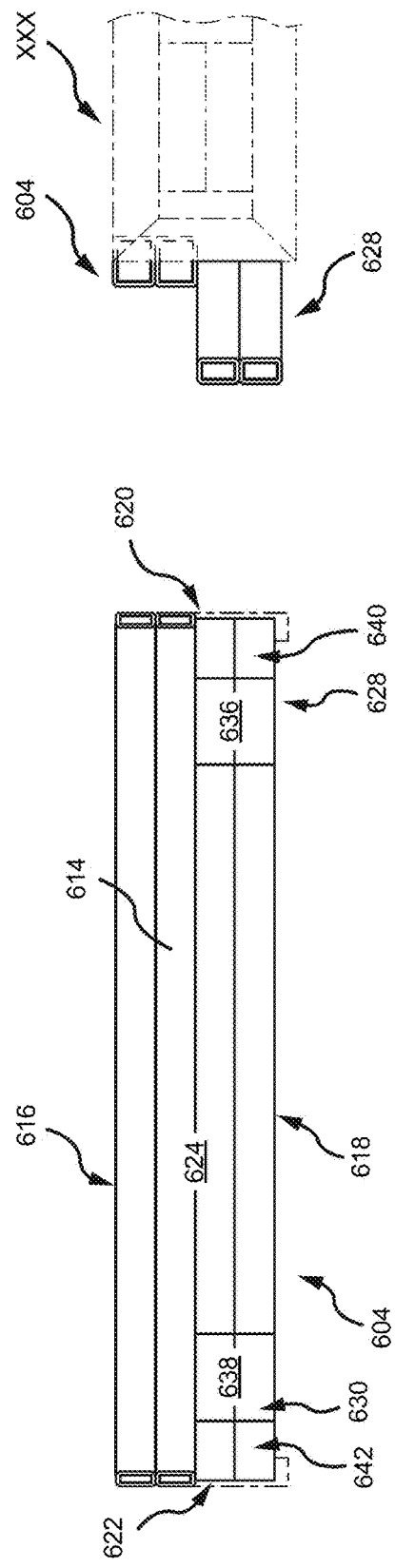
FIG. 13C
FIG. 13B

METHOD AND SYSTEM FOR DYNAMICALLY CHARGING A COKE OVEN

CROSS-REFERENCE TO RELATED APPLICATIONS

This application is a continuation of U.S. patent application Ser. No. 15/392,942, filed Dec. 28, 2016, which claims the benefit of priority to U.S. Provisional Patent Application No. 62/271,963, filed Dec. 28, 2015, the disclosure of which is incorporated herein by reference in their entirety.

TECHNICAL FIELD

The present technology is generally directed to dynamic charging in heat recover coke ovens related to the operation and output of coke plants.

BACKGROUND

Coke is a solid carbon fuel and carbon source used to melt and reduce iron ore in the production of steel. In one process, known as the "Thompson Coking Process," coke is produced by batch feeding pulverized coal to an oven that is sealed and heated to very high temperatures for approximately forty-eight hours under closely-controlled atmospheric conditions. Coking ovens have been used for many years to convert coal into metallurgical coke. During the coking process, finely crushed coal is heated under controlled temperature conditions to devolatilize the coal and form a fused mass of coke having a predetermined porosity and strength.

Coal particles or a blend of coal particles are charged, or loaded, into the hot ovens, and the coal is heated in the ovens. Due to the high temperature of the ovens during the charging process, the coal feeding process must use conveyers to convey coal particles horizontally into the ovens and provide an elongate bed of coal. The conveyer, which is manually-controlled by an operator, enters the ovens from a pusher side opening and charges coal into oven as it extends toward a coke side opening at the opposite end of the oven. Once the conveyer reaches the opposite end and finishes charging the bed, the conveyer retracts out of the oven from the same side it entered. Once charged, the oven is sealed and heated to form coke.

The manual charging of an oven in this manner commonly results in an uneven coal bed profile. More specifically, opposite ends of the coal bed will often have a different thickness of material, with the coal near the pusher side opening having a significantly greater thickness than the coal near the coke side opening. As a result of the uneven bed profile, the portion of coal at the thin side cokes out much faster and experiences a higher burn loss. The charging of the oven in this manner also commonly leads to inconsistent coke quality and short charging the oven, in which a coal capacity less than the oven's full potential is loaded. The overall effect is reduced coke quality, coke output and revenue for a coke-producing facility.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified.

FIGS. 13A to 13C depict a side elevation view of one embodiment of a charging head according to the present technology.

DETAILED DESCRIPTION

Figure 1:
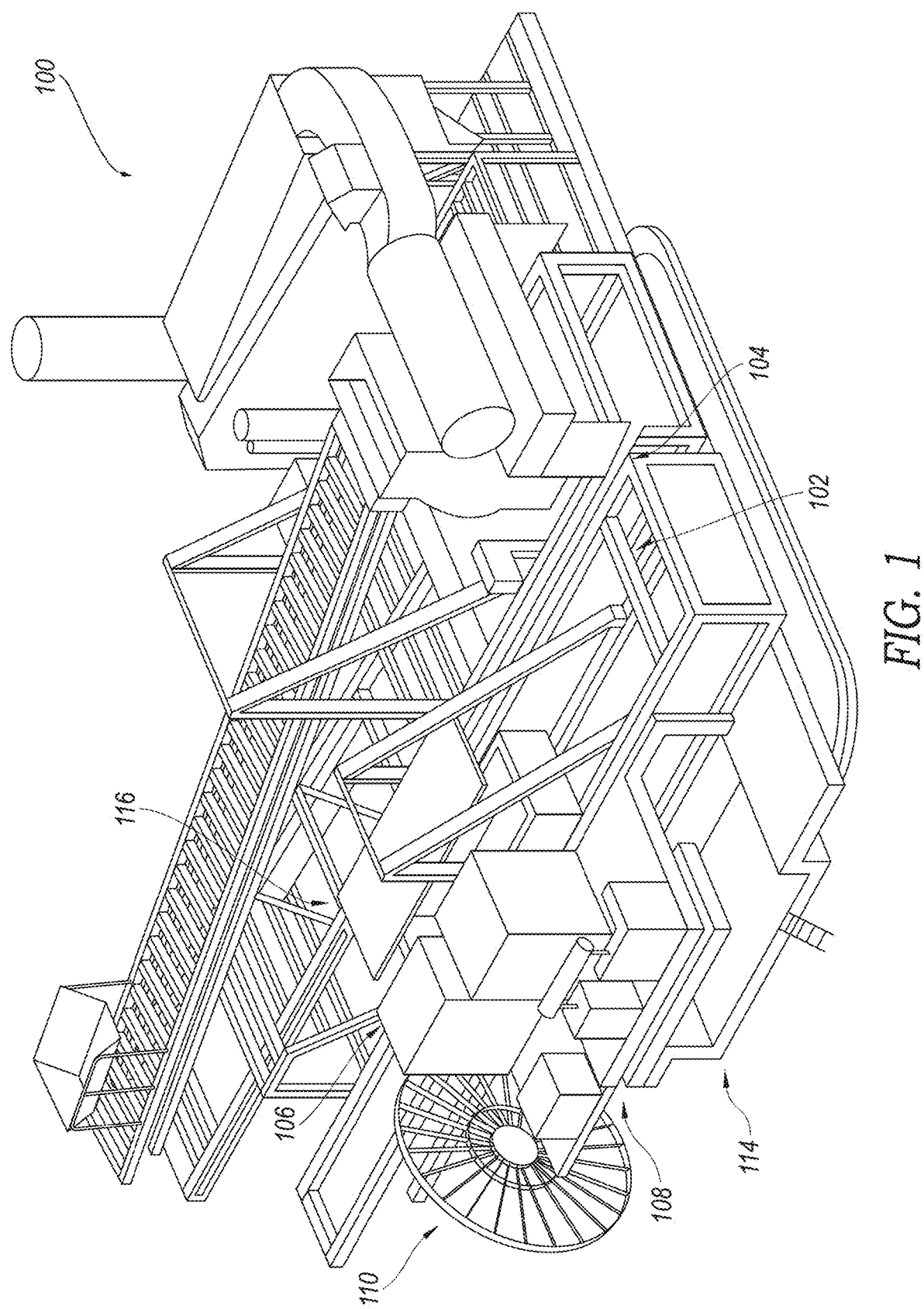
FIG. 1 depicts a schematic illustration of one embodiment a pusher charger machine according to the present technology.

The present technology is generally directed to methods of increasing a coal processing rate of coke ovens. One aspect of the present technology is to develop a control system for a charging ram to dynamically charge an oven in order to optimize the oven capacity, coking process, production yield and coke quality. The control system allows each oven to be charged with a more uniform density which results in uniform temperature distribution in the oven and better control of coking cycle time. In some embodiments, a coal charging system includes a charging ram in communication with a control system configured to automatically move the charging ram. The automatic movement of the charging ram can be based on maintaining a steady charging pressure (e.g. chain pressure) while simultaneously charging coal into an oven, or to loading the oven according to an oven profile. Another aspect of the present technology is to develop a dynamic leveler system. In some embodiments, the control system may be configured to automatically adjust the vertical height of the charging ram to maintain an initial charging height or desired height of the charging ram throughout the charging process. Another aspect of the present technology is to develop a scanning system used in conjunction with the control system. In some embodiments, the scanning system is coupled to the charging ram and is positioned to scan the oven floor to determine an oven capacity for coking and/or an oven floor profile. Using the determined oven capacity and/or the oven floor profile, the control system is configured to automatically adjust its vertical position while charging coal into the oven. Yet another aspect of the present technology is to determine the oven floor profile from a pusher ram as the pusher ram removes coke from an oven after it has been coked out. Yet another aspect of the present technology is to strengthen the charging ram to decrease the amount of sag of the distal end of the charging ram. In some embodiments, the charging frame is strengthened using a combination of stiffener plates, RIB support members and rollers.

Specific details of several embodiments of the technology are described below with reference to the Figures. Other details describing well-known structures and systems often associated with pusher systems, charging systems, and coke ovens have not been set forth in the following disclosure to avoid unnecessarily obscuring the description of the various embodiments of the technology. Many of the details, dimensions, angles, spatial orientation and other features shown in the Figures are merely illustrative of particular embodiments of the technology. Accordingly, other embodiments can have other details, dimensions, angles, spatial orientation and features without departing from the spirit or scope of the present technology. A person of ordinary skill in the art, therefore, will accordingly understand that the technology may have other embodiments with additional elements, or the technology may have other embodiments without several of the features shown and described below with reference to the Figures.

FIG. 1 depicts one embodiment of a pusher charger machine (PCM) 100, which includes an operator's cab 116, an instrumentation enclosure 106, a main power transmission 110, a main frame 114, pusher ram 102, door extractor 104 and hydraulic system 108. In accordance with aspects of the disclosure, the PCM 100 is typically used for a number of different operations, including to remove and replace a coal side oven door, push a batch of charged coke from the ovens, decarb the oven, or charge coal into the ovens. According to one embodiment, a PCM operation sequence begins as the PCM 100 is moved along a set of rails that run in front of an oven battery to an assigned oven. The PCM 100 aligns its coal charging system with the oven and removes the pusher side oven door using the door extractor 104 from the coal charging system. The PCM 100 is then moved to align the pusher ram 102 of the PCM 100 to the center of the oven and the pusher ram 102 is energized to push coke from the oven interior. The PCM 100 is again moved to align the coal charging system with the oven center and coal is delivered to the coal charging system of the PCM 100 by a tripper conveyor. The coal charging system then charges the coal into the oven interior. The charging conveyor is then retracted from the oven from the same side it was inserted. Finally, the door extractor 104 of the PCM 100 replaces and latches the pusher side oven door. Alternatively, a separate pusher apparatus and charging apparatus may be used.

Several embodiments of the present technology are directed towards charging the coal in the oven to achieve a constant thickness and constant density of coal in each oven. Other embodiments are directed towards charging the coal in the oven to achieve a maximum amount of coal in each oven. Therefore, the charging procedure is described in detail to better understand how the charging of the oven is improved. Further to the charging procedure described previously, after the PCM 100 pushes the coke out from the oven, the PCM 100 will tram to the right and align the coal charging system with the oven. According to one embodiment, once the alignment is completed, a false door will extend into the oven and the charging ram moves into the oven. A charging delivery device such as a conveyor or charging chain moves forward to deliver coal from a tripper car to a hopper on the PCM and eventually onto the false door. The coal is charged into the oven by the delivery device such as the chain on the charging ram. As coal is charged into the oven, the level of coal and within the oven begin to increase. An operator can monitor and use a sensed charging pressure (e.g. chain pressure) of the charging ram as an indication of the amount of coal being charged into the oven at a given position of the charging ram. As the charging pressure increases, the operator can decrease the charging pressure and/or maintain the charging pressure at a desired pressure by manually moving the charging ram from the pusher side opening of the oven towards the coke side opening of the oven. The coal charging operation is manually controlled by the operator controlling, for example, a joystick in the operator's cab 116.

Figure 2:
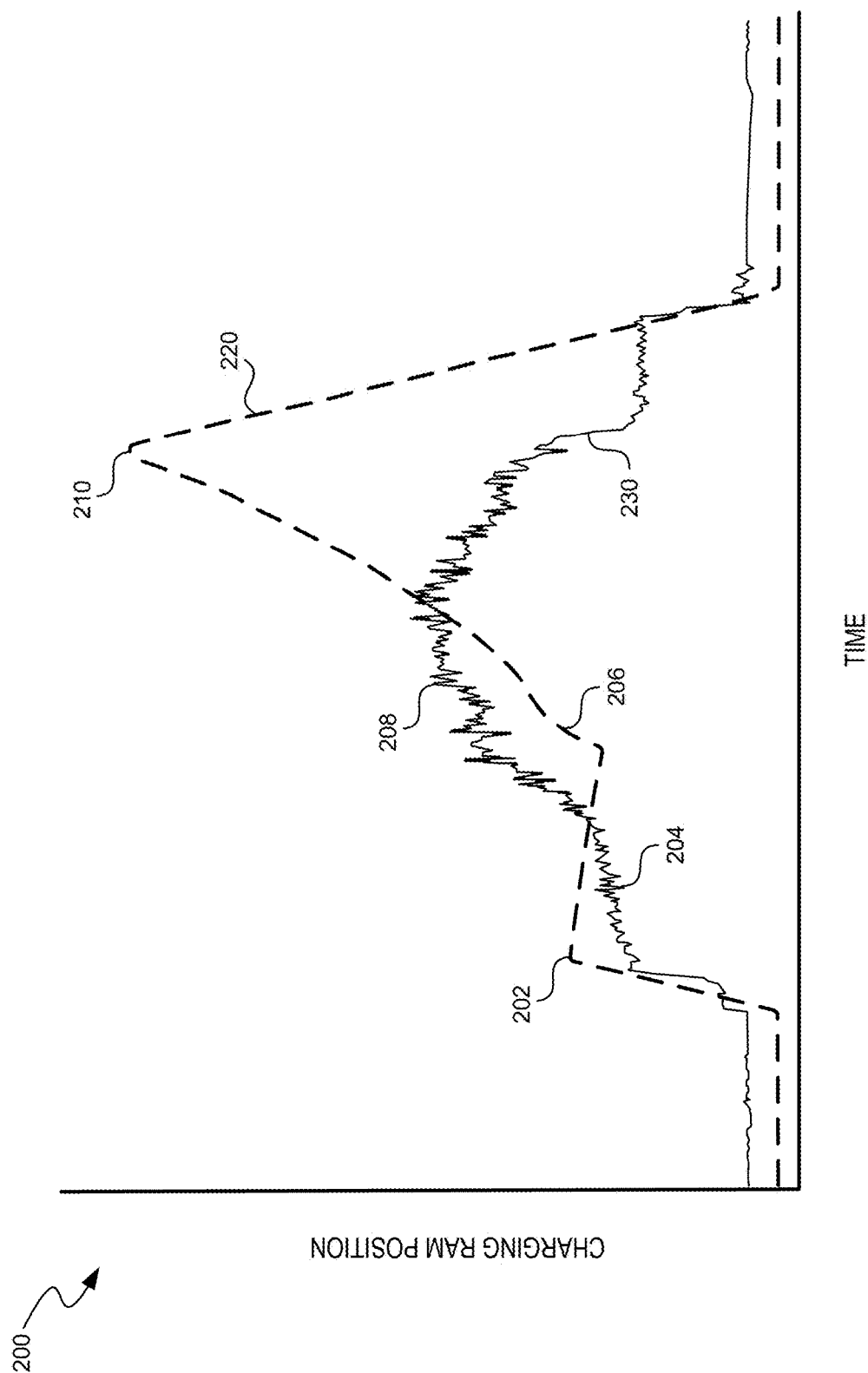
FIG. 2 depicts a plot of trial data of a charging ram position and charging pressure during manual charging operation according to the present technology.

FIG. 2 shows an exemplary process trend 200 of an operator manually charging the oven. Line 220 indicates the position of charging ram as it moves from the pusher side toward the coke side of the oven. Line 230 indicates the charging pressure as the charging ram moves from the coke side toward the pusher side of the oven. As shown, the charging ram is moved approximately 5-15 feet inside the oven to an initial position when the charging ram begins to charge the oven with coal. While in this initial position, charging pressure begins to build, as shown by time period suurounding 204. The slight drop of line 220 (between points 202 and 206) shows the charging ram drifting backward due to the pull back by the chain's tension as a result of the increasing charging pressure. Once the charging pressure builds up to a predetermined pressure, the operator starts moving the charging ram toward the coke side opening of the oven while charging the oven 206. Coal is charged into the oven until the charging ram reaches approximately the end of the oven 210. During this charging time period, the operator is attempting to maintain the charging pressure approximately at a predetermined set point. Throughout the charging, however, the charging pressure 230 fluctuates dramatically, as shown by time period surrounding 208. In addition to the manual operation of the charging ram by the operator, there are several factors that may vary the charging pressure in the charging process, including the inconsistent carbon level on the oven floor, deflection and sag of the charging ram, coal moisture, and the inconsistent oven charge weight.

Figure 3:
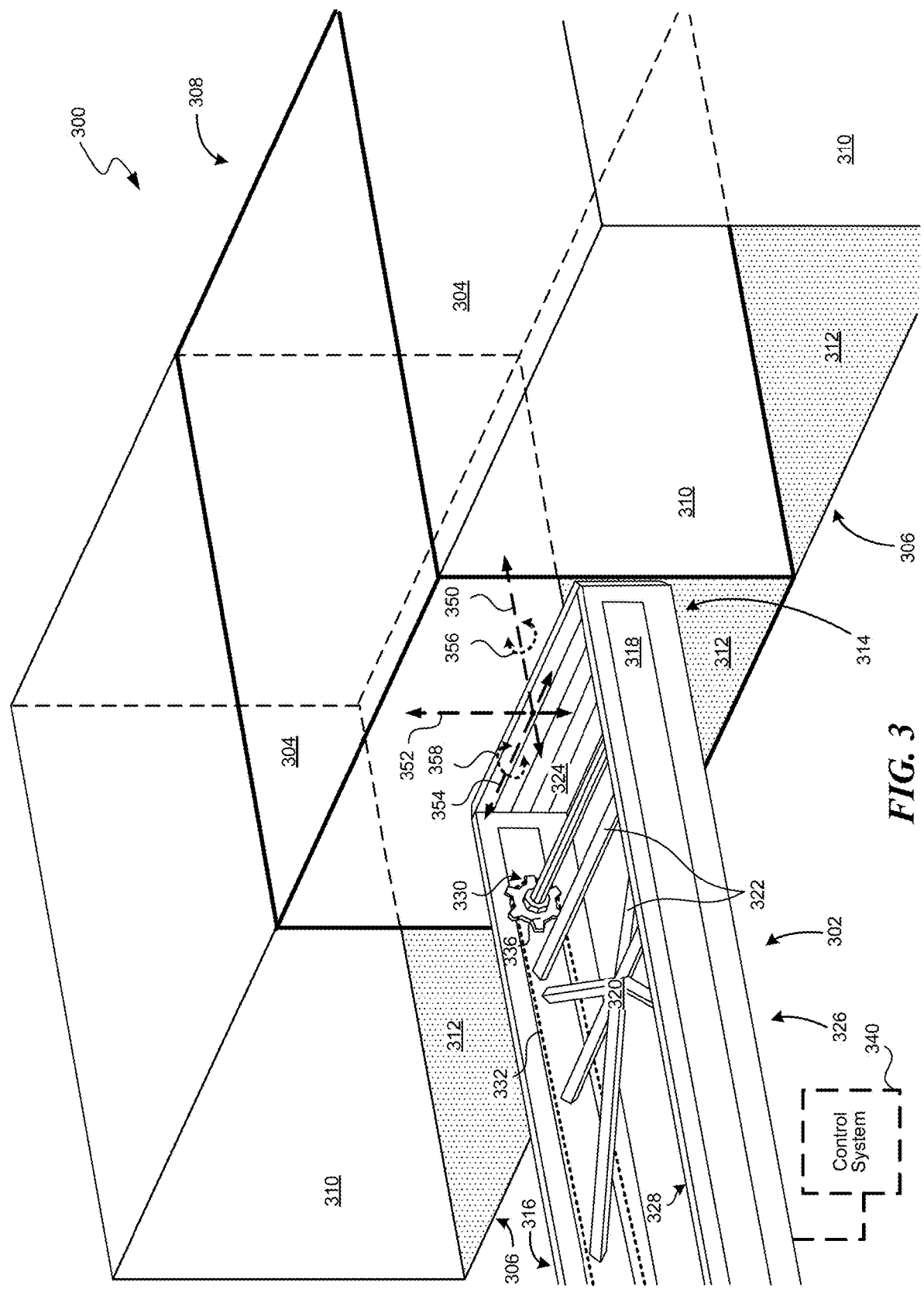
FIG. 3 depicts a side, upper perspective view of one embodiment of a charging ram and coke oven according to the present technology.

FIG. 3 is a schematic illustration of a coal charging system 300, configured in accordance with embodiments of the present technology. The coal charging system 300 can include a plurality of horizontal coke ovens 304, a charging ram 302 and a control system 340. The charging ram 302 includes a proximal end portion 316 and a distal end portion 314 comprising a vertically-oriented charging ram head 324. The charging ram 302 also includes vertically-oriented opposite sides 318 that span between the proximal 316 and distal end portions 314 of the charging ram 302 and define a length of the charging ram 302.

Each oven 304 includes a pusher side opening 306, a coke side opening 308 opposite the pusher side opening 306, and opposite side walls 310 that together define an oven floor 312. Each oven 304 has an oven ceiling opposite the oven floor 312. The pusher side opening 306 of the oven 304 is the side by which the distal end portion 314 of the charging ram 302 generally enters the oven 304 to charge coal onto the oven floor 312. The plurality of ovens 304 can include any bank of horizontal coke ovens, including, for example, heat-recovery and non-heat-recovery ovens. In some embodiments, the oven floor 312 is generally flat, as is depicted in FIG. 3. In other embodiments, the oven floor 312 will not be flat and may include sloped surfaces (i.e., pitched upwards, downwards, or to the side), valleys, divots or buildup of carbon material. Flue tunnels located beneath the oven floor 312 may also contribute to the unevenness of the oven floor 312.

In accordance with one embodiment of the disclosure, the coal charging system 300 also includes a rotatably endless conveyer system 330 operably coupled to the charging ram 302 and used to charge coal into the oven 304. The conveyer system 330 includes a chain and fly 332 mechanism coupled to gears 336 that are rotatably mounted to each of the opposite side walls 318 of the charging ram 302. As the conveyer system 330 charges coal into the oven 304, coal begins to build to reach a lower level of the conveyer system 330 and eventually contact the chain 332 of the conveyer system 330. This contact creates a drag force on the conveyer system 330 that results in what may be referred to as a charging pressure (e.g., chain pressure). Charging pressure can be determined by a pressure sensor coupled to the charging ram 302 and used as an implicit identification of how much coal has been charged into the oven at a given position of the charging ram 302.

The coal charging system 300 also includes a control system 340 in communication with the charging ram 302 and used to control movement of the charging ram 302 into and out of the ovens 304. The control system 340 is also used to control and is in communication with the conveyer system 330. The control system 340 allows operators to control aspects of the PCM from a remote location. Many embodiments of the control system 340 and/or technology described below may take the form of computer-executable instructions, including routines executed by a programmable computer. The control system 340 may, for example, also include a combination of supervisory control and data acquisition (SCADA) systems, distributed control systems (DCS), programmable logic controllers (PLC), control devices, and processors configured to process computer-executable instructions. Those skilled in the relevant art will appreciate that the technology can be practiced on computer systems other than those described herein. The technology can be embodied in a special-purpose computer or data processor that is specifically programmed, configured or constructed to perform one or more of the computer-executable instructions described below. Accordingly, the terms "control system" and "computer" as generally used herein refer to any data processor. Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of particular embodiments of the disclosed technology.

In the present application, the control system 340 is configured to automatically move the charging ram 302 (1) in a first direction generally along a z-axis 350 between the coke side opening 308 and the pusher side opening 306 of the oven, (2) in a second direction generally along an x-axis 354 between opposite side walls 310 of the oven 304, and (3) in a third direction generally along a y-axis 352 between the oven floor 312 and the ceiling of the oven 304 located opposite the oven floor 312. The control system 340 may also be configured to automatically move the charging ram 302 in a fourth direction generally rotatable 356 around the z-axis 350, twisting the charging ram 302 in either a clockwise or counter-clockwise direction, such that when the charging ram 302 is twisted, one of the opposite side walls 318 of the charging ram 302 is located higher or lower than the other of the opposite walls 318. In some embodiments, the control system 340 may also be configured to automatically move the charging ram 302 in a fifth direction generally rotatable 358 around the x-axis 354, such that the distal end 314 of the charging ram 302 can be angled upwards away from the oven floor 312, or downwards towards the oven floor 312. In some embodiments, the automatic movement of the charging ram is determined at least in part by the charging pressure experienced by the conveyor system. Details of the control system 340 are described in greater detail below. Moving the charging ram 302 in these directions may be done using a drive system that is operably coupled to the charging ram 302 and in communication with the control system 340. The drive system may include a hydraulic drive, electric drive, screw drive, or other motive drives as known in the art.

Figure 4:
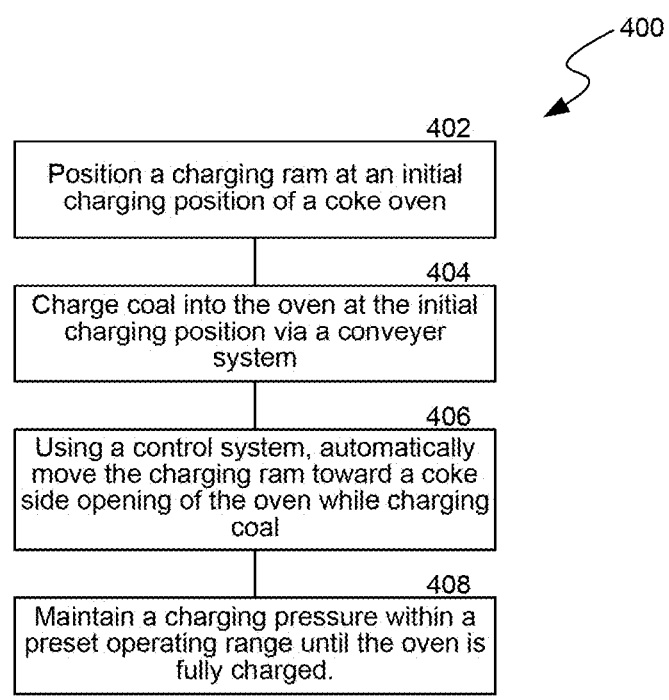
FIG. 4 depicts a block diagram of a method of dynamically charging an oven of a coal charging system according to the present technology.

FIG. 4 is a block diagram of a method 400 of dynamically charging a coal charging system in accordance with embodiments of the technology. At block 402, the method 400 includes positioning a charging ram at an initial charging position of a coke oven. In some embodiments, the initial charging position includes at least an x- and z-coordinate position (i.e. in the horizontal direction). In other embodiments, the initial charging position may include only a y-coordinate position (i.e. in the vertical direction), or a y-coordinate position in addition to an x- and z-coordinate position. Positioning the charging ram at the initial charging position may also serve as a prerequisite condition that must be met for the control system 340 to proceed to step 404 and begin to perform the automatic function of charging the oven 304. Positioning the charging ram 302 may also include locking the charging ram 302 in the initial charging position to prevent the charging ram 302 from migrating backwards toward the pusher side opening 306.

At block 404, the method 400 includes charging coal into the oven 304 at the initial charging position via the conveyor system 330. Charging coal into the oven includes loading coal onto the oven floor 312 and building a cake of coal that exerts a charging pressure on the conveyor system 330. In some embodiments, charging pressure may be required to reach a preset locking pressure of over 1700 psi before the locking mechanism releases the charging ram from the initial charging position. In other embodiments, the locking pressure may need to build to 3000 psi or higher before the locking mechanism is released. Notably, the control system can be programmed to automatically release the locking mechanism once the preset locking pressure is reached.

At block 406, the method 400 includes, using a control system 340, automatically moving the charging ram 302 while simultaneously charging coal into the oven 304. Using a control system 340 may include using inputs to the control system 340 to dynamically charge the oven 304. Inputs to the control system 340 may include those described below with reference to FIG. 7. Automatically moving the charging ram 302 can include automatically reacting to the inputs without manual intervention by the operator or in addition to manual intervention by the operator. As previously mentioned, moving the charging ram 302 can include moving the charging ram 302 in at least one of (1) a first direction generally along a z-axis 350 between the coke side opening 308 and the pusher side opening 306 of the oven, (2) a second direction generally along an x-axis 354 between opposite side walls 310 of the oven 304, (3) a third direction generally along a y-axis 352 between the oven floor 312 and the ceiling of the oven 304 located opposite the oven floor 312, (4) a fourth direction generally rotatable 356 around the z-axis 350, and (5) a fifth direction generally rotatable 358 around an axis parallel to the x-axis 354 and positioned at the proximal end 316 of the charging ram 302. As such, the charging ram 302 can be rotated such that the distal end 314 in a rotated state can be located either above or below the corresponding proximal end 316 of the charging ram 302.

At block 408, the method 400 includes maintaining a charging pressure within a preset operating range until the oven is fully charged. In some embodiments, the preset operating range of the charging pressure will be set between 2000-3500 psi, whereas in other embodiments, the preset operating range will be set to between 2300-2900 psi. In yet other embodiments, the preset operating range will be set even more narrowly to between 2500-2700 psi. Maintaining the charging pressure can include maintaining the charging pressure by holding the charging ram in a given position to build charging pressure, moving the charging ram in a given direction to decrease charging pressure, or varying the rate of speed of the charging ram. In other embodiments, the charging pressure will be maintained at a single set point inputted by the operator.

Figure 5:
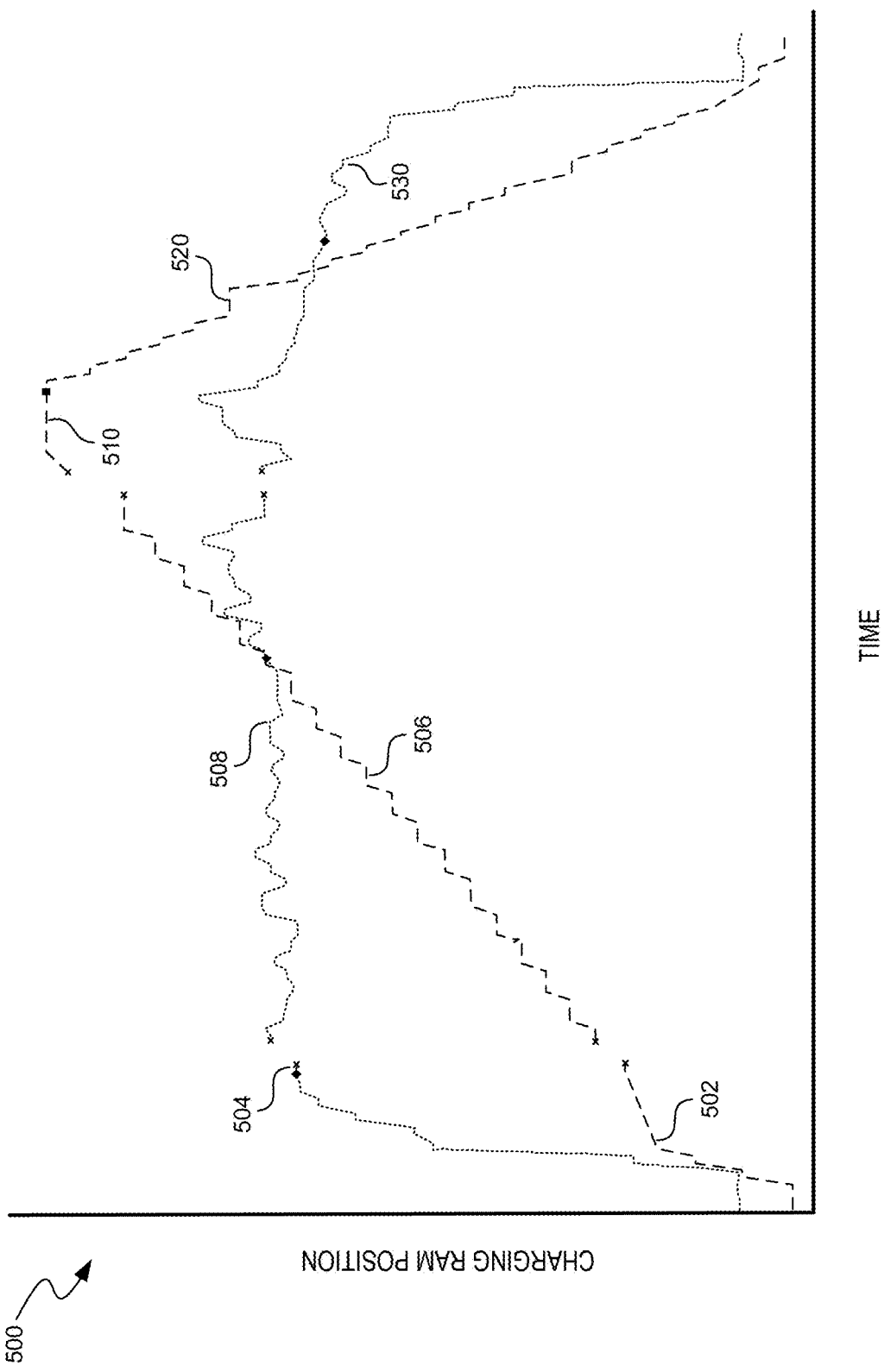
FIG. 5 depicts a plot of trial data of charging ram position and charging ram pressure during auto charging operation according to the present technology.

FIG. 5 depicts a plot 500 of trial data of charging ram position 520 and charging ram pressure 530 according to the present technology. As shown, the plot 500 depicts how the charging pressure varies in relation to the charging ram position (in the z-direction 350) during auto-charging of an oven using the control system 340. In line with the method described above with reference to FIG. 2, once the PCM 100 pushes the coke out from the oven 304, the PCM aligns the coal charging system with the oven 304. At this point, the leveler setting of the charging ram 302 may be adjusted (i.e. raised or lowered) hydraulically. Once the level is set, the false door and charging ram 302 will extend into the oven 304. At point 502, the charging ram 302 is moved into the oven and stopped at an initial charging position for building up charging pressure. In some embodiments, the charging ram 302 will be locked into this initial charging position via the locking mechanism, which mechanically couples the charging ram 302 to the PCM 100. This locking mechanism can prevent the charging ram 302 from migrating backwards towards the pusher side opening 306 as the oven is charged, as was previously shown in FIG. 2. As shown by step 504, while in this initial position, coal is being charged onto the oven floor 312 while the charging ram is stationary and charging pressure begins to build.

Once a preset charging pressure is reached, the control system 340 releases the locking mechanism and begins to automatically move the charging ram 302. Each instance the charging ram 302 moves from a first position to a subsequent second different position, charging pressure will decrease and then subsequently increase once the level of coal builds up at the second position. As previously mentioned, the charging pressure is used by the control system 340 as an implicit measure of how much coal is charged into the oven 312 at that particular position of the charging ram 302. In this embodiment, this change in pressure is because the second position, whether towards the coke side opening or one of the opposite side walls, or away from the oven floor, is a location of the oven that has less coal buildup than was present at the first position. This movement is indicated by the step-wise shape of the charging ram position, as shown by step 506. As shown by step 508, a generally steady charging pressure during this charging period is maintained because of the control system's continual adjustment of the charging ram position in response to the charging pressure variation.

The steady charging pressure shown in FIG. 5 as compared to the variable charging pressure shown in FIG. 2 is also because of other inherent advantages that the control system has over manual control by an operator. The control system 340, for example, can include parameters such as filtering or proportional-integral-derivative (PID) control to better anticipate and adjust to the changing charging pressure. The control system 340 can also be programmed specifically for particular ovens based on previous charges of those ovens. Step 510 indicates the charging ram 302 reaching the end of the oven 304 and retracting back towards the pusher side opening 306 of the oven 304. As the charging ram 302 is retracted back towards the pusher side opening 306 of the oven 304, the charging pressure decreases.

Although the charging ram position 520 FIG. 5 refers generally to its horizontal position along the z-axis 350, the same principles apply to movement of the charging ram 302 along the x-axis 354 and y-axis 352. For example, movement from a first position to a subsequent second different position along the x-axis 354 or y-axis 352 will similarly decrease the charging pressure and then subsequently increase the charging pressure once the level of coal builds up at the second position.

It is worth noting that the charging pressure is just one measure that can be used to determine the amount of coal that has been charged into the oven 304 at a given position. In practice, any reactionary force, such as pressure or weight, or changing dimension, such as volume or height, that is created as a result of charging the oven 304 can also be used as the measure to determine the amount of charged coal. For example, in other embodiments, electrical signals (e.g., power, voltage, current, etc.), optical signals (e.g., lasers), visual signals (e.g., cameras), or radio waves (e.g., radar) may also be used instead of or in addition to charging pressure.

Figure 6:
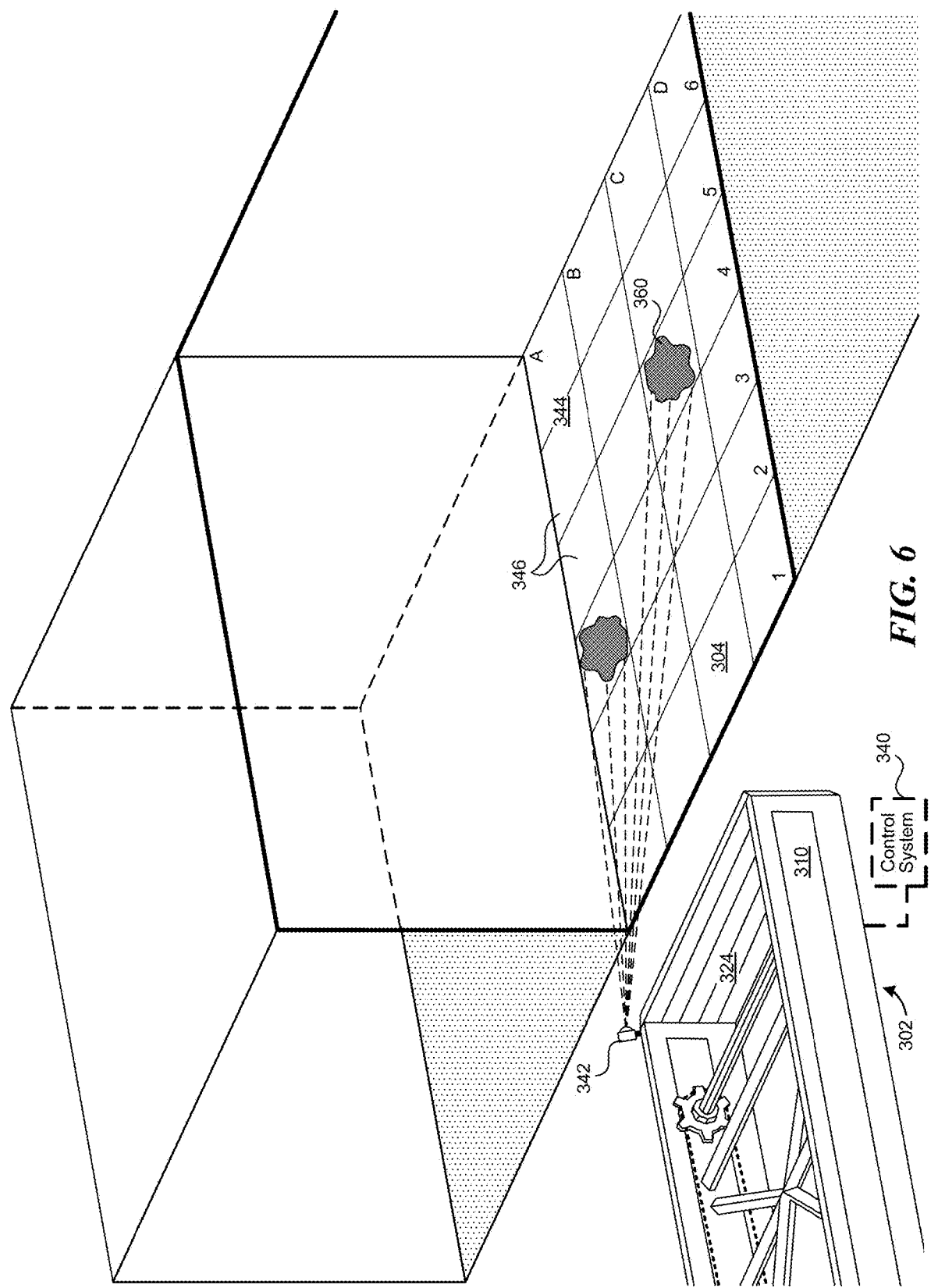
FIG. 6 depicts a side, upper perspective view of one embodiment of a scanning system coupled to a charging ram according to the present technology.

FIG. 6 is another schematic illustration of a coal charging system, configured in accordance with embodiments of the present technology. FIG. 6 has many features generally similar to those of FIG. 3 described above. Notably, FIG. 6 includes a scanning system 342 mechanically coupled to the charging ram 302 and in electrical communication with the control system 340. In some embodiments, the scanning system 342 can instead be mounted to the charging head 324 or the charging ram frame 320. In yet other embodiments, the scanning system 342 can also be mounted to a structure of the PCM 100 other than the charging ram 302. For example, the scanning system 342 may mounted to the pusher ram 102 or any other structure that has a view of the oven floors 304.

The scanning system 342 may include any device capable of capturing an image or assigning markers to a location. In some embodiments, the scanning system 342 will include be a camera capable of capturing an 2-D or 3-D image of the oven floor 312. These cameras can include UV cameras, infrared cameras, high-speed cameras, or other cameras including different spectrums known in the art. The scanning system 342 may also include a plurality of lasers or radars that scan the oven 302 and oven floor 312 to determine abnormalities or material resulting in an uneven oven floor 312.

One of the benefits of the scanning system 342 is to create a real-time loading map which can be used to ensure an oven 304 is charged with a constant thickness throughout the oven 304. A constant thickness throughout an oven 304 ensures that coke quality is maximized. Notably, the thickness of a coal bed is measured as the difference from the top of the charged coal to the bottom of the charged coal, and is not necessarily measured from the top of the charged coal to the bottom of the oven floor 312. If, for example, a section of leftover coke remains in an oven 304, the measured thickness for that section is the difference from the top of the carbon material to the bottom of the carbon material positioned immediately above that leftover coke. Accordingly, scanning the oven 304 can allow a coal charging system to locate uneven portions of the oven floor 312 and proactively adjust the loading plan for that oven 304. For example, when loading a section of the oven 304 that has a buildup of material, the control system 340 can proactively adjust the charging ram 302 in the vertical direction 352 in that section to ensure a uniform thickness throughout the oven 304. Another benefit of the scanning system 342 is to create a real-time loading map which can be used to ensure an oven 304 is charged with a varying thickness to maximize the amount of coal charged into the oven. This feature is described below with reference to FIG. 6.

As shown in the embodiment of FIG. 6, the scanning system 342 can project a virtual grid 344 onto the oven floor 312. This virtual grid 344 can categorize each section of the oven floor 312 into an x-z coordinate area, or an x-y-z coordinate area. For example, the grid 344 may divide and characterize the oven floor 312 into a plurality of sections 346, such that each section 346 of the grid 344 corresponds to an actual location of the oven floor 312. Each section 346 can then be used to locate a relative location of leftover material 360 (e.g., coal, coke, clinker, coal testing box, etc.) on the oven floor. The virtual grid 344 in FIG. 6 is represented by a 7×6 dimension comprising 42 separate sections 346. In other embodiments, the virtual grid 344 may also be represented by a dimension comprising many more sections (i.e. over 500) to attain a more accurate relative location of material 360 on the oven floor.

In some embodiments, the scanning system 342 is configured to scan the oven floor 312 to determine any buildup (i.e. leftover material 360) or unevenness on the oven floor. Each scan by the scanning system 342 can generate an oven capacity, oven floor profile and/or oven profile for that particular oven. In other embodiments, the oven capacity, oven floor profile and/or oven profile may also be determined without the scanning system. For example, the pusher ram 102, which pushes coke from the oven 304 may also be used to develop the oven floor profile. When the pusher ram 102 pushes the charged coke from the pusher side opening 306 of the oven 304 towards the coke side opening 308 of the oven 304, the pusher ram 102 experiences a resistance that is based at least in part on the height and/or weight of the charged coke bed, wherein a higher resistance implicitly indicates a thicker layer of charged coke at that particular position. The varying resistance, which may be reflected in, for example, variation in a hydraulic or electric signal, can then be used to create an oven profile to be used by the control system 340 to dynamically vary the height of the charging ram 302, as described above.

In addition to the resistance experienced by the pusher ram 102, an auto-leveling system may also be included on the pusher ram 102. The pusher ram 102 can dynamically move in any direction (i.e. along any of the x-y-z axes) and has skid shoes positioned behind the pusher ram and in contact with the oven floor 312. Accordingly, the oven floor profile can be captured and then transferred to the control system 340 for use during subsequent oven charges.

The oven capacity represents an estimate for the amount of coal that can be charged into the oven for a single cycle. The oven capacity can be calculated by using the scan of the oven floor 312 to determine a surface area of the oven floor 312 that is covered by buildup and then estimate a volume associated with the surface area. This estimated volume can then be subtracted from the design oven capacity for a particular oven.

The oven floor profile quantifies variations in the oven floor 312. In addition to considering the leftover buildup, the oven floor profile may also consider permanent buildup, oven construction variation, trenches, valleys, divots, etc. that may contribute to the variations or unevenness of the oven floor 312. After determining areas of unevenness and assigning a location to those areas, using, for example, the virtual grid 344, the oven profile can create a real-time loading map, which can then be used to provide a height that the charging ram 302 needs to be at each section during the subsequent charge. The scanning system 342, therefore allows the control system 340 to dynamically charge an oven 304 such that the thickness of the coal bed is constant throughout. For example, prior to charging an oven 304, the scanning system 342 can scan the oven floor 312 and determine which if any sections along the x-y coordinate area have an amount of carbon remaining. As shown in the embodiment of FIG. 6, the area and locations of leftover coke in sections A3 and C4 is translated to the control system 340. During a subsequent charge, the control system 340 can consider the x-y coordinate to adjust its vertical movement and/or duration of time spent when the system is charging the oven 304 at that particular x-y coordinate. Adjusting these parameters proactively, instead of solely reactively (e.g., in response to charging pressure) can further contribute to charging each coal bed with a constant thickness and uniform density.

In addition to scanning the oven floor 312, the scanning system 342 can also be used to scan an overall oven 304 to create an oven profile. This can help determine other opportunities to charge additional coal into an oven 304 and achieve a maximum amount of coke with each oven cycle. For example, some ovens have ducts (i.e., downcommers) connected to the flue tunnels beneath the oven floor 312 that are present on one or both of the opposite side walls 310 of the oven 304. These downcommers have openings which are commonly located approximately midway up the side walls 310 of the oven 304. If the level of charged coal is higher than these open ends, the coal can fall into the downcommers and block them. The scanning system 342 can be used to identify the locations where these downcommers are and the locations where these downcommers are not. By knowing and translating these locations to the control system 340, the control system 340 can avoid charging coal in discrete areas adjacent to the openings of the downcommers and can charge additional coal in those areas not adjacent to the openings of the downcommers. In this instance, "adjacent" refers to the area surrounding the openings of the downcommers wherein charged coal would fall into the openings of the downcommers. Accordingly, based on the oven profile provided by the scanning system 342, an oven 304 can be charged to maximize its oven capacity by charging additional coal in areas not adjacent to the openings of the downcommers.

The scanning system 342 can also be used to create an oven profile for an oven 304 after it has been charged. For example, once an oven 304 is fully charged, the charging ram 302 retracts towards the pusher side opening 306 and exits the oven 304 to begin charging a subsequent oven. In some embodiments, the scanning system 342 can create an oven profile after the charging ram 302 exits the oven 304 and before it begins charging the subsequent oven. This oven profile represents an actual oven profile, including the level or thickness of coal within the oven 304, and can be used to adjust the method for charging that particular oven in a subsequent load. For example, by knowing the oven floor profile before an oven 304 was charged and the actual oven profile after the oven 304 was charged, an operator can continually adjust the method for charging and know whether the adjustments are leading to improvements. According to additional embodiments, an oven 304 may be charged multiple times for a single firing of that oven 304. For example, the control system 340 can be configured to scan the oven 304 to generate a first oven floor and/or oven profile, charge the oven 304 based on the oven floor and/or oven profile, retract the charging ram 302, re-scan the oven 304 to generate a second oven profile, and charge additional coal into the oven 304 to ensure the coal has a constant thickness throughout the oven 304 or to maximize the amount of coal in the oven 304. The scanning system 342 can also be used to create an oven profile for an oven 304 and after it has been coked out.

Figure 7:
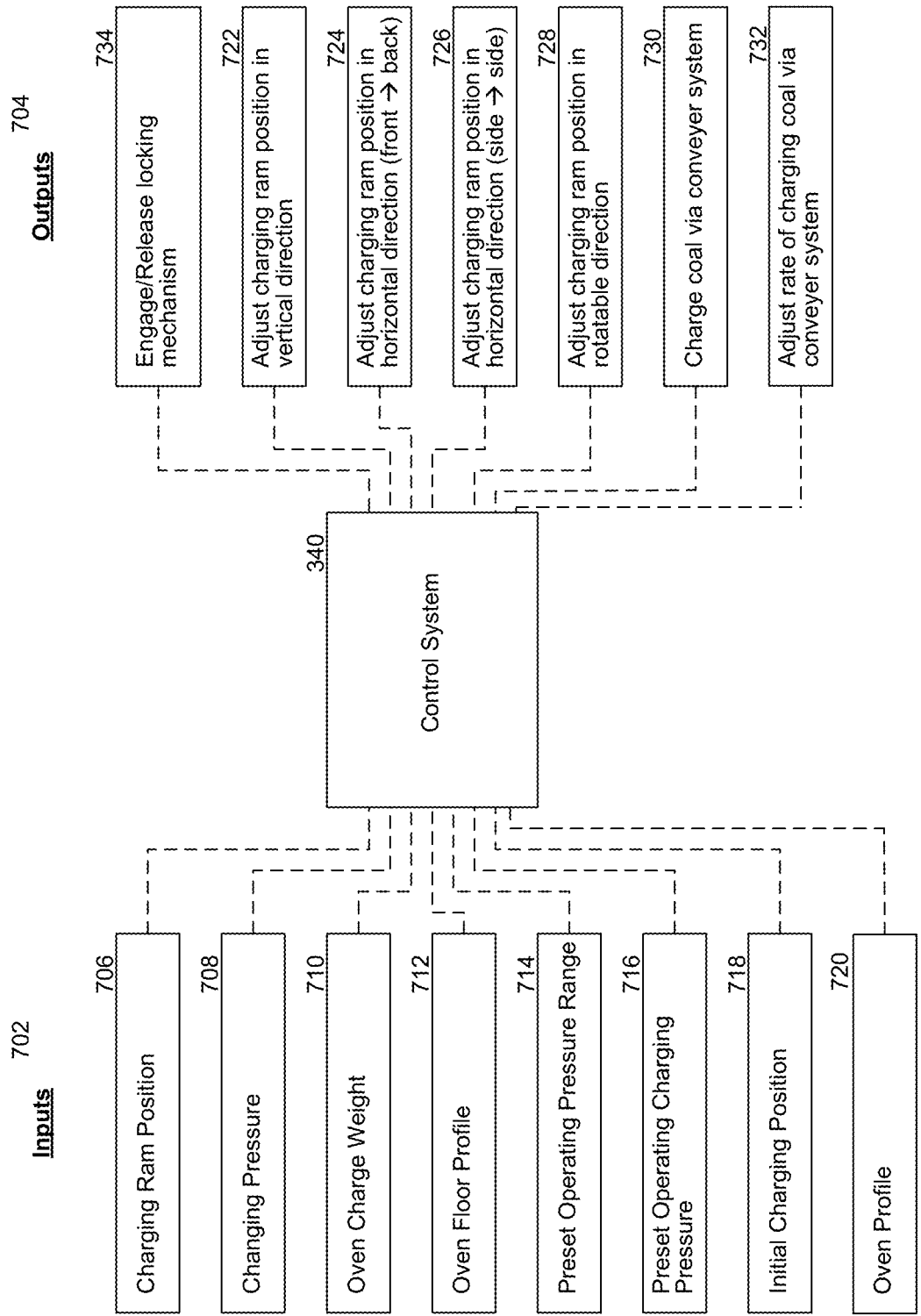
FIG. 7 depicts a schematic diagram illustrating various inputs and outputs of a control system according to the present technology.

FIG. 7. depicts a schematic diagram illustrating various inputs 702 and outputs 704 into a control system 340 according to the present technology. The inputs can include charging ram position 706, charging pressure 708, oven charge weight 710, oven floor profile 712, preset operating pressure range 714, preset operating charging pressure 716, initial charging position 718, and oven profile 720. Using these inputs 702, the control system 340 can have multiple outputs 704 including to engage/release the locking mechanism 734, adjust the charging ram position in a horizontal first direction 724, adjust the charging ram position in a horizontal second direction 726, adjust the charging ram position in a vertical third direction 722, adjust the charging ram position in rotatable fourth and/or fifth direction 728, start and/or stop charging coal via the conveyor system 730, and adjust the rate of charging coal via the conveyer system 732. This list of inputs 702 and outputs 704 is not meant to be all encompassing, as various other inputs to and outputs from the control system 340 exist. Each input 702 and output 704 may also represent an input from multiple sources. For example, the oven floor profile input 712 can represent an input from the scanning system 342 or the pusher ram 102 resistance, as described above. Additionally, each input 702 can represent multiple inputs to the control system 340. For example, the oven profile input 720 can have a first oven profile input of an oven 304 that has yet to be charged, a second oven profile input for an oven 304 that has already been charged, and a third oven profile input for an oven 304 that has already been charged and coked. Additionally, each input 702 may correspond to multiple outputs 704. For example, an oven floor profile input 712 could affect the charging ram position in the vertical direction 722, the charging ram position in the horizontal direction (front to back) 724, and the charging ram position in the horizontal direction (side to side) 726.

Figure 8:
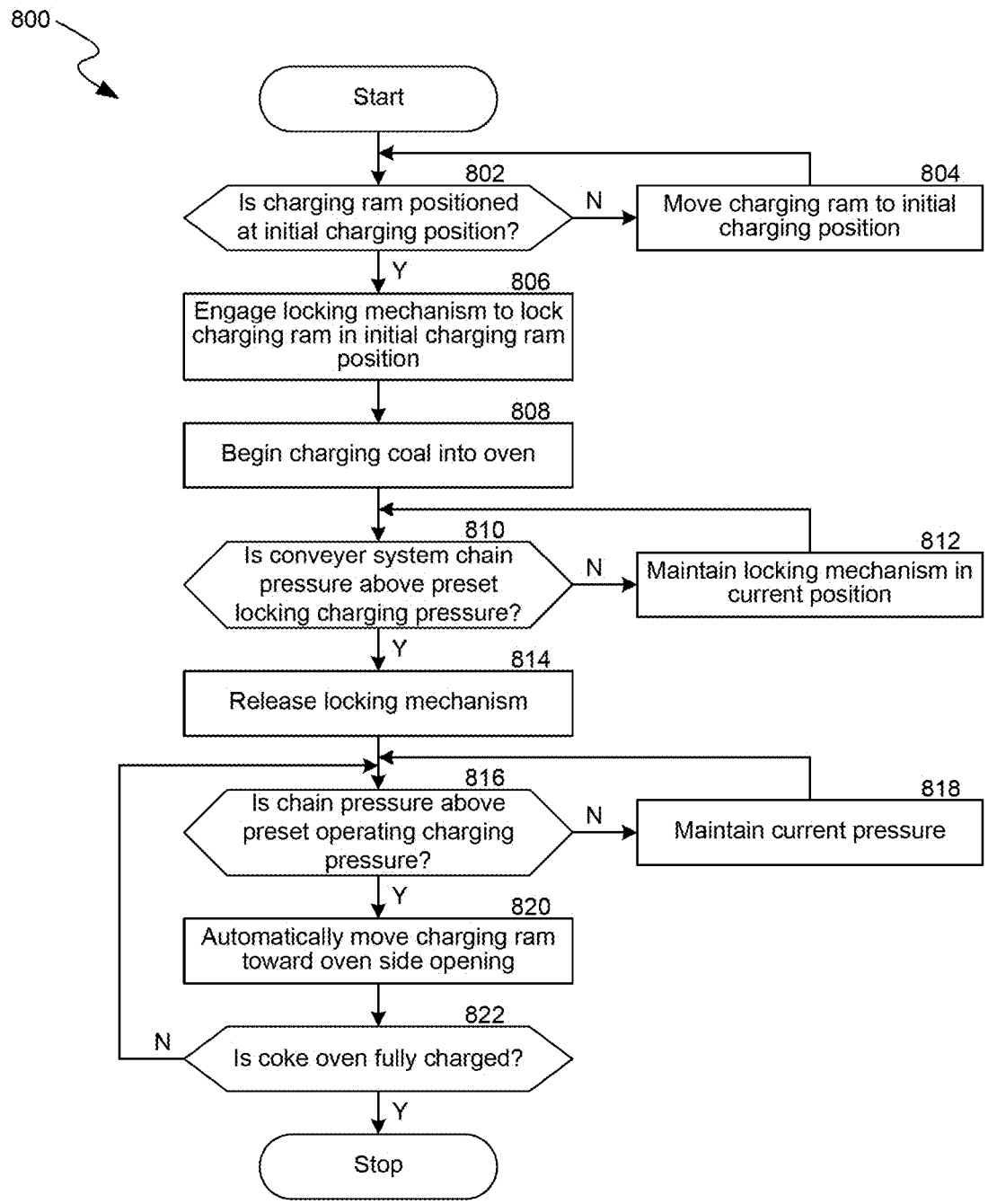
FIG. 8 depicts a flowchart for dynamically charging an oven of a coal charging system according to the present technology.

FIG. 8 depicts a flowchart of a method for dynamically charging an oven 304 of a coal charging system according to the present technology. The method 800 starts at decision block 802, wherein the control system 340 determines whether the charging ram 302 is positioned at the initial charging position. As was previously described, the initial charging position can correspond to a particular position along the x-z coordinate and/or a particular position along the y-coordinate. This initial charging position will typically be set by the operator. In some embodiments, for example, the initial charging position may be approximately five feet past the pusher side opening 306 of the oven 304. If the control system 340 determines that the charging ram 302 is not in the initial charging position, processing continues to block 804 wherein the control system 340 moves the charging ram 302 to the initial charging position. Once the system determines that the charging ram 302 is in the initial charging position, the method proceeds to block 806 and engages the locking mechanism to lock the charging ram 302 in its initial charging position. Next, the control system 340 proceeds to block 808 to begin charging coal into the oven 304. As previously described, as coal is charged into the oven 304, charging pressure begins to build. At decision block 810, the control system 340 determines whether the charging pressure is above the preset charging pressure. As previously mentioned, the preset charging pressure will be set by the operator, and in some embodiments, will be set to 2300 psi. If the current charging pressure as determined by the control system 340 is above the preset charging pressure, then the control system 340 may automatically release the locking mechanism 814. If the current charging pressure is not above the preset charging pressure, then the control system 340 may not automatically release the locking mechanism 812.

Once the locking mechanism is released, the method 800 proceeds to decision block 816, wherein the control system 340 determines if the charging pressure is above the preset operating charging pressure. In some embodiments, the preset operating charging pressure will be equal to or slightly above the preset locking charging pressure. If the current charging pressure as determined by the control system 340 is not above the preset operating charging pressure, then the control system 340 may maintain its current position and wait for charging pressure to continue to build 818. If the current charging pressure is above the preset operating charging pressure, then the control system 340 may automatically move the charging ram 302 generally toward the coke side opening 308 of the oven 304 820. Moving the charging ram 302 toward the coke side opening 308 can also include moving the charging ram 302 toward opposite side walls 310 of the oven 304, or moving the charging ram away from the oven floor 312. As the control system 340 automatically moves the charging ram 302, decision block 822 determines whether the oven 304 is fully charged. The control system 340 may determine that the oven 304 is fully charged if the charging ram 302 is positioned at a set position near the coke side opening 308 of the oven. This position may be a manual input by the operator or be determined automatically by the control system 340. If the control system 340 determines that the oven 304 is fully charged, the method ends. If the control system 340 determines that the oven 304 is not fully charged, then the control system 340 returns prior to decision block 816 to determine whether the charging pressure as determined by the control system is above the preset operating charging pressure.

Figure 9A:
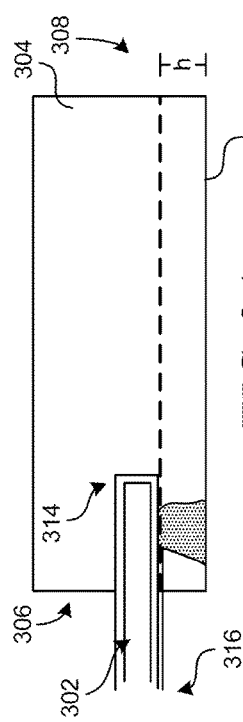
FIGS. 9A-H depict side perspective views of embodiments of a charging ram at various positions while charging coal into an oven according to the present technology.
Figure 9B:
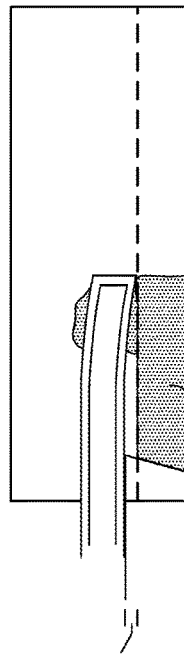
Figure 9C:
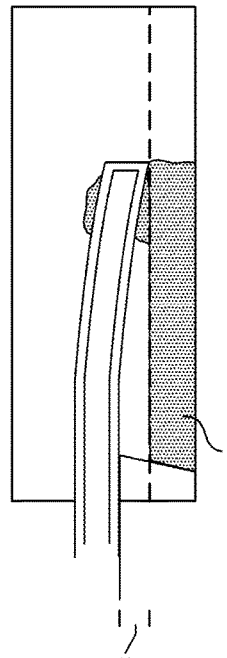
Figure 9D:
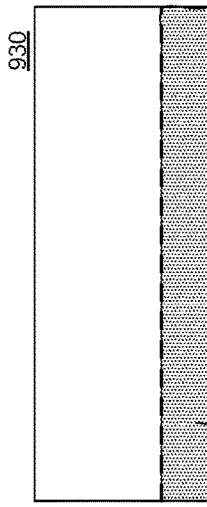

FIGS. 9A-H depict side perspective views of a charging ram 302 at various positions while charging coal 394 into an oven 304 according to the present technology. More specifically, FIGS. 9A-D show the effect of the charging ram's sag (i.e., $S_1$ and $S_2$) as the distal end 314 of the charging ram 302 moves toward the coke side opening 308 of the oven 304 and how the dynamic leveling ability of the control system 340 can address this issue. As shown in FIG. 9A, the charging ram 302 enters the pusher side opening 306 of the oven 304 at an initial charging height, h, and begins charging coal 394 into the oven 304. FIG. 9B shows the charging ram 302 after having further progressed towards the coke side opening 308. Notably, as the distal end 314 of the charging ram 302 extends further away from the structural support (not shown) at the proximal end 316 of the charging ram 302, the distal end 314 of the charging ram 302 begins to sag, $S_1$, and drop below the initial charging height, h. As a result, coal 384 is charged below the initial charging height, h. FIG. 9C shows the additional sag, $S_2$, as the distal end 314 of the charging ram 302 extends yet further into the oven 304. FIG. 9D shows a generalized side perspective view of the charged oven profile. Notably, the thickness of the coal bed 384 at the coke side opening 308 is significantly less than the thickness of the coal bed at the pusher side opening 306.

Figure 9E:
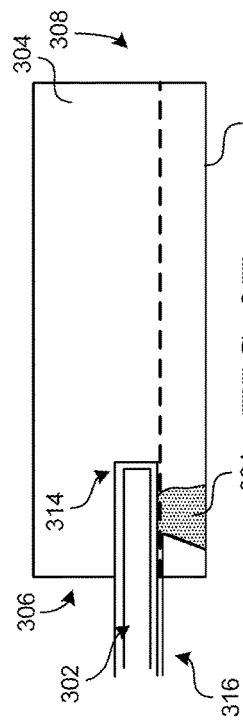
Figure 9F:
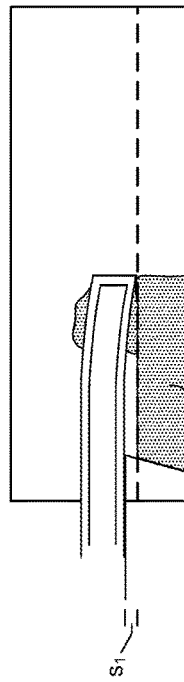
Figure 9G:
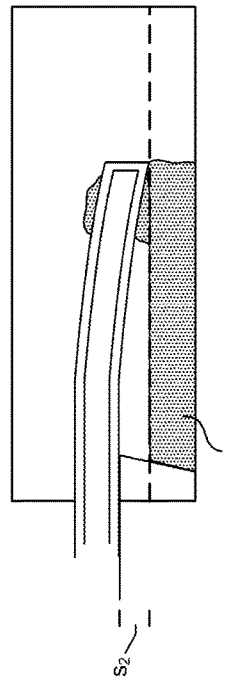
Figure 9H:
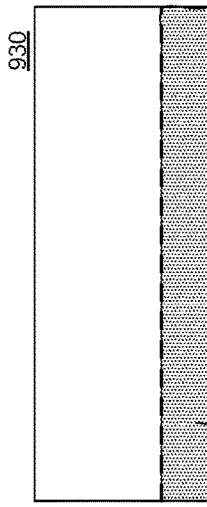

FIGS. 9E-H show how the dynamic leveler ability of the control system 340 can affect the oven profile. FIG. 9E, similar to FIG. 9A, shows the charging ram 302 entering the pusher side opening 306 of the oven 304 and charging coal 394 into the oven 302 at the initial charging height, h. As the charging ram 302 progresses toward the coke side opening 308, the dynamic leveler system automatically raises the distal end 314 of the charging ram 302 to account for the expected charging ram sag (i.e., $S_1$ and $S_2$) and maintain the distal end 314 of the charging ram 302 at the initial charging height, h. As shown in FIG. 9F, the charging ram 302 is raised by a height equal to the sag $S_1$ at that particular charging ram position. In some embodiments, the dynamic leveler ability of the control system 340 can ensure the distal end 314 of the charging ram 302 is at or near the initial charging height, h, by a sensor (not shown) in communication with the control system 340 that determines the height of the distal end 314 of the charging ram 302. In other embodiments, the sag (i.e., $S_1$ and $S_2$) of the charging ram 302 at each deployed position is known and programmed into the control system 340 before charging commences. FIG. 9G shows the charging ram 302 at a further deployed position, wherein the dynamic leveler ability of the control system 340 has raised the proximal end 316 of the charging ram 302 by a height equal to the sag $S_2$ to maintain the distal end 314 of the charging ram 302 at the initial charging height. FIG. 9H shows a theoretical side perspective view of an oven profile with a constant thickness between the pusher side opening 306 and coke side opening 308.

Notably, the dynamic leveler ability of the control system 340 may also be utilized to adjust the height of the charging ram 302 while the charging ram 302 is being retracted from the oven back towards the pusher side 306 of the oven 304. As the charging ram 302 is retracted, the charging ram 302 can be raised to clear the coal or adjusted to contact the coal such that coal is dragged back by the charging ram 302 to further help distribute the coal evenly across the oven or to further maximize the amount of coal to be charged. In some embodiments, the oven profile and/or oven capacity used to charge the oven 304 may also be utilized during retraction of the charging ram 302 to further optimize the charge of each oven 304. Retraction of the charging ram 302 is discussed in further detail below with reference to FIGS. 12-16.

Figure 10A:
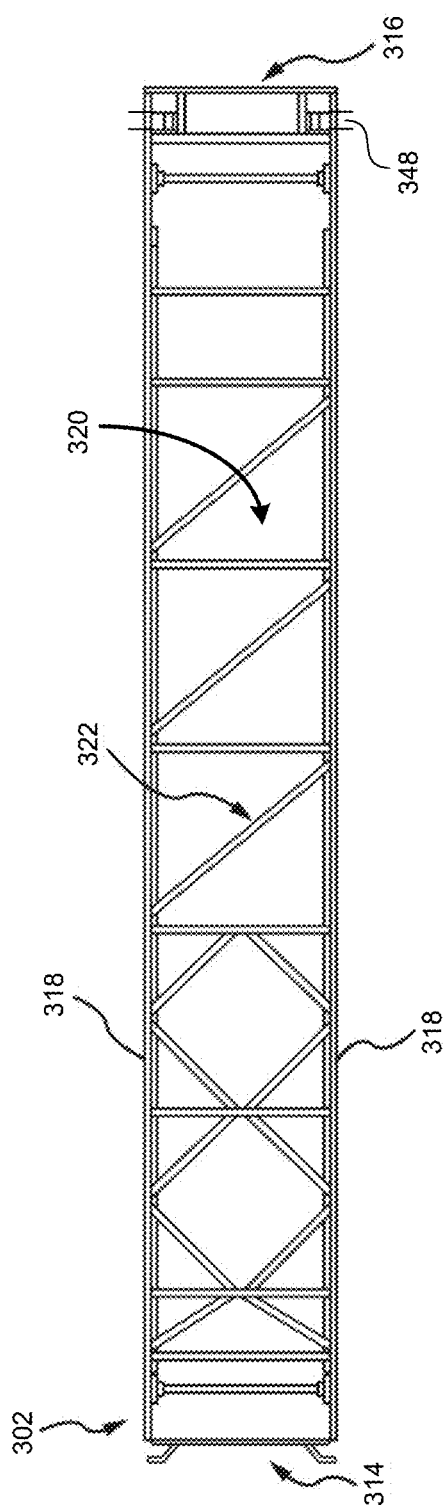
FIG. 10A depicts a top, plan view of one embodiment of the charging frame depicted in FIG. 3.
Figure 10B:
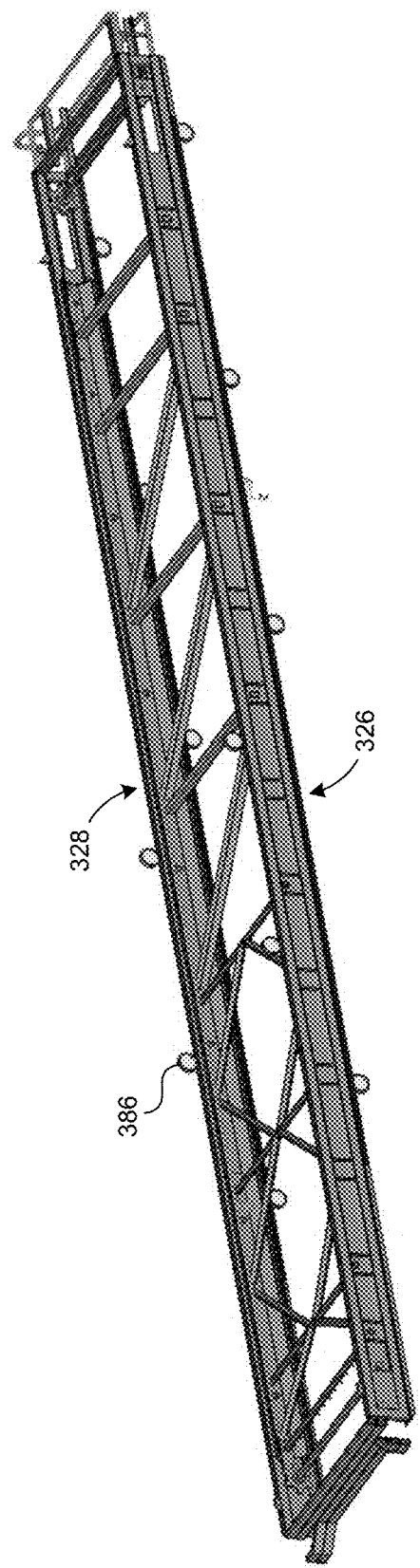
FIG. 10B depicts a side, upper perspective view of one embodiment of the charging frame with rollers according to the present technology.

As has been previously described, one method to optimize dynamic charging in a coke oven is to use the automatic oven charging control system, scanning system and/or dynamic leveler system. Another method to optimize charging is to mechanically strengthen the charging ram to reduce the sag of the charging ram. Referring next to FIGS. 10A and 10B, the charging ram frame 320 includes a plurality of horizontally oriented cross support braces 322 mechanically coupled to opposite sides 318 of the charging ram 302. The charging ram 302 itself is connected to and supported by the PCM 100 at the proximal end 316, while the distal end 314 is free floating. One purpose of the support braces 322, therefore, is to maintain the structural integrity of the whole charging ram 302. The support braces 322 may be positioned normal or diagonal to the vertically-oriented sides 318 of the charging ram 302. In some embodiments, each support brace 322 may have a diamond-like shape and be arranged such that upper 388 and lower portions 386 of the support brace 322 represent top and bottom points of the diamond. Notably, the support braces 322 are connected to the interior surface 376 of the sides of the charging ram 302 and do not penetrate the exterior surface 378 of the opposite sides 318 of the charging ram 302. The support braces 322 may also comprises a hollow beam and include a hole opening 390 (FIG. 11A) drilled into the lower portion 386 of each support brace 322. This is to ensure fluid (e.g. water) and gases are not trapped within the support brace 322. According to further aspects of the disclosure, the automatic oven charging control system, scanning system and/or dynamic leveler system may be combined with the mechanically strengthened charging ram to further maximize the quantity of coal, the density of coal or the uniformity of coal in the oven.

As shown in FIG. 10A, the charging ram 302 also includes a locking mechanism 348 attached to the proximal end 316 of the charging ram 302. The locking mechanism 348 can include a single male or female coupling or pair of male or female couplings that can be mechanically coupled to a corresponding coupling attached to a stationary structure of the PCM 100. As previously described, the locking mechanism 348 can prevent the charging ram 302 from migrating backwards towards the pusher side opening 306 of the oven 304 during the initial charging process.

FIG. 10B depicts a side, upper perspective view of one embodiment of the charging frame 320 with rollers 386 according to the present technology. The rollers 386 are attached to upper 328 and lower portions 326 of opposite sides 318 of the charging ram 302. The rollers 386 control and help mechanically hold the distal end 314 of the charging ram 302. Thus the addition of a plurality of rollers on upper 328 and lower 326 portions of both opposite sides 318 can further lower the sag of the charging ram 302 when extended.

Figure 11A:
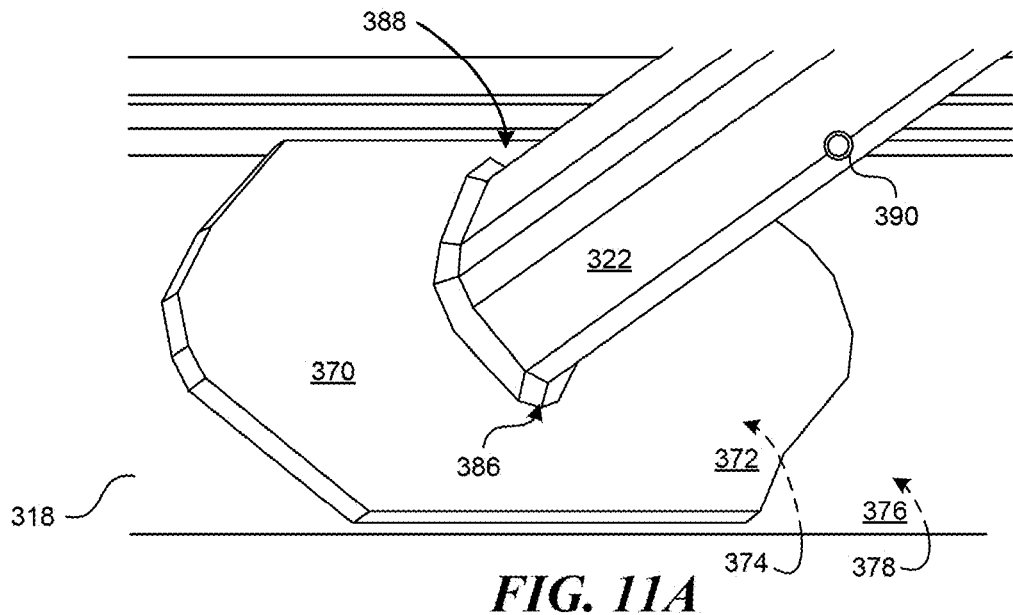
FIGS. 11A and 11B depict a side, lower perspective view of one embodiment of a cross brace supported by a stiffener plate and a RIB support member according to the present technology.
Figure 11B:
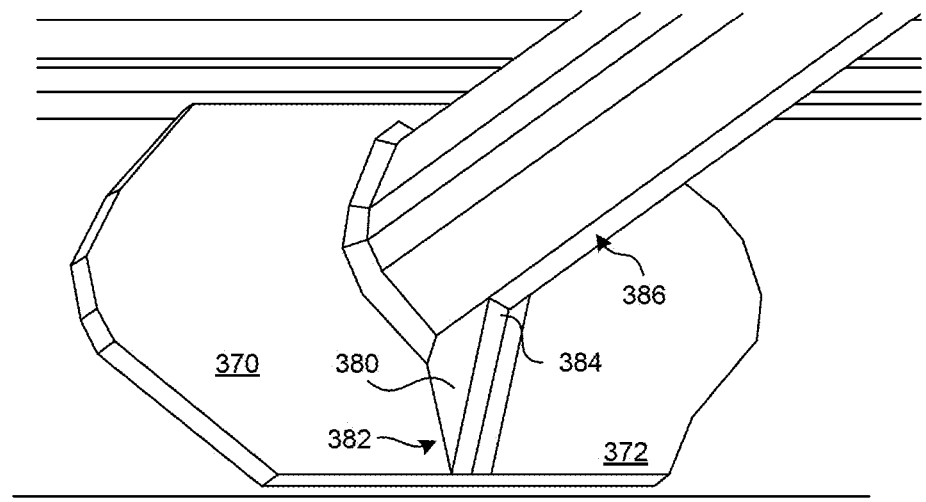

Each support brace 322 provides additional structure support to further limit the sag of the charging frame 320 as the distal end 314 extends further away from the structural support of the PCM 100. To further limit this sag, additional structural supports may be coupled to each end of the cross support braces 322. FIGS. 11A and 11B depict a side, lower perspective view of a cross brace 322 supported by a stiffener plate 370 and RIB support member 380 according to the present technology. Each stiffener plate 370 is positioned between an end of a respective cross support brace 322 and side 318 of the charging ram 302. The stiffener plate 370 thereby encases at least a portion of the end of each support brace 322. As such, the stress resulting from the load of the upper 388 and lower portions 386 of the diamond support brace is distributed over the larger area of the stiffener plate 370. The stiffener plate 370 includes an interior facing surface 372 mechanically coupled (e.g. welded) to the cross support brace 322, as well as an exterior facing surface 374 that is opposite the interior facing surface 372 and adhered to a side of the charging ram 302. The stiffener plate 370 may be composed of any carbon-steel or metal material. In one embodiment, the stiffener plate can have an overall length between 24-30 inches, a height between 8-14 inches and a thickness between ½-1 inch. In other embodiments, these dimensions may vary depending on the surface area of the end of the support brace 322 and side walls 318 of the charging ram 302.

RIB support members 380 are also included to provide additional mechanical support to each cross support brace 322. Specifically, the diamond-shaped support braces 322 and coupling arrangement to the side walls 318 of the charging ram 302 result is additional weight at the lower portion 386, or bottom corner, of the support brace 322. The RIB support 380 helps to distribute the load and increase the weld length of that area. Each RIB support member 380 is thus positioned at a lower portion 386 of the support braces 322, such that a first surface 382 of the RIB support member 380 is mechanically coupled to the interior facing surface 372 of the stiffener plate 370 and a second surface 384 of the support member 380 is mechanically coupled to the lower portion 386 of the support brace 322. The RIB support member 380 may be composed of material similar to that of the stiffener plate 370.

Data taken during testing of installed stiffener plates 370 and RIB support members 380 indicates a dramatic improvement in the amount of stress experienced by the support brace 322. For example, the maximum stress exhibited at an interior surface 372 of the opposite side walls 318 of the charging ram 302 near a lower portion 386 of the support brace 322 without the stiffener plate 370 or RIB support 380 was upwards of 3400 psi. The max stress exhibited at a lower portion 386 of the support brace 322 with the stiffener plate 370 decreased to approximately 1740 psi, and further decreased to approximately 1665 psi with the RIB support 380. Similar tests at an exterior surface 378 of the opposite side walls 318 of the charging ram 302 near the lower portion 386 of the support brace 322 shows a maximum stress of 5000 psi with no stiffener plate 370 or RIB support 380, 3585 psi with the stiffener plate 370 and 3530 psi with the stiffener plate 370 and RIB support 380. This approximately 40% improvement in decreased maximum stress was consistent across a number of experimental analysis tests.

Figure 12:
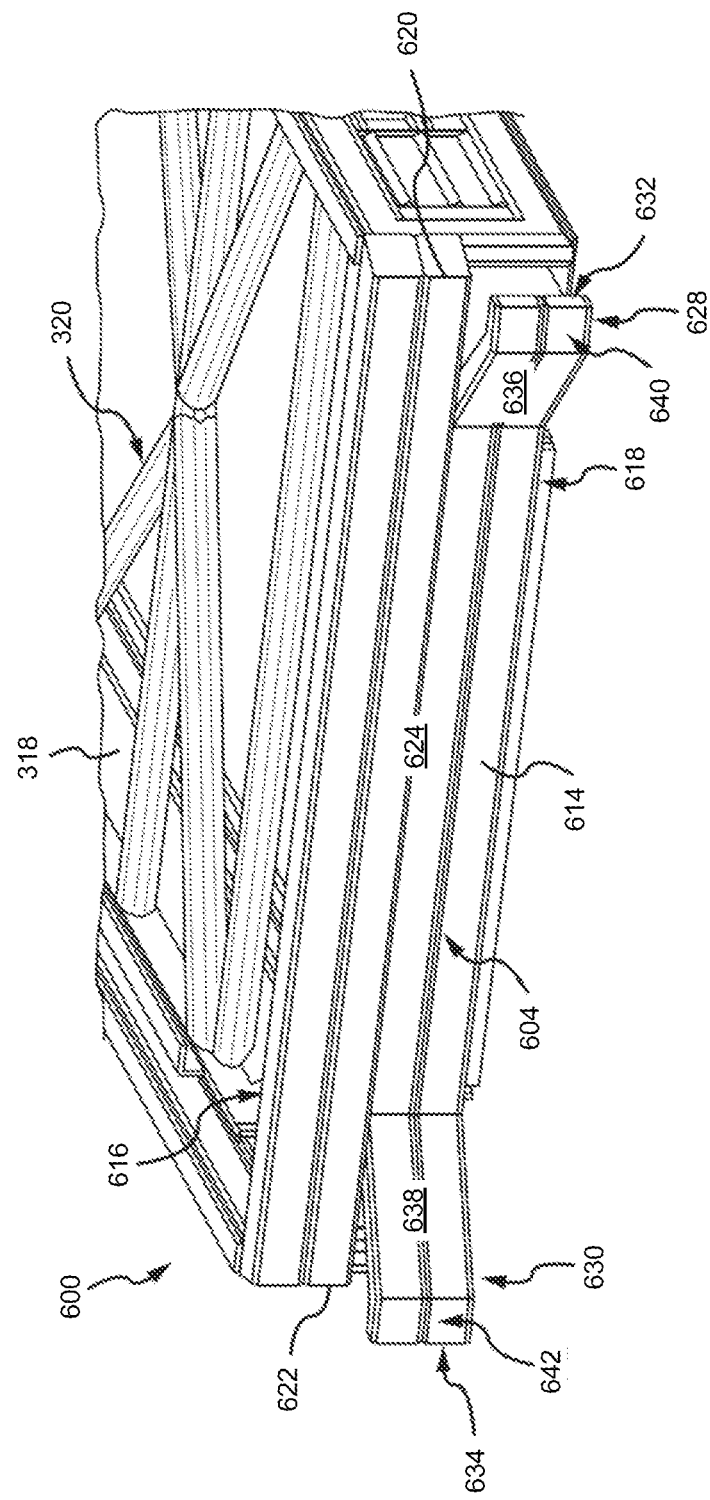
FIG. 12 depicts a front, perspective view of one embodiment of a charging frame and charging head of a coal charging system according to the present technology.

FIG. 12 depicts a front, perspective view of one embodiment of the charging frame 320 and a charging head 604 of a coal charging system 600 according to the present technology. In various embodiments, the charging head 604 is defined by a planar body 614, having an upper edge portion 616, lower edge portion 618, opposite side portions 620 and 622, a front face 624, and a rearward face 626. In some embodiments, a substantial portion of the body 614 resides within a charging head plane. This is not to suggest that embodiments of the present technology will not provide charging head bodies having aspects that occupy one or more additional planes. In various embodiments, the planar body is formed from a plurality of tubes, having square or rectangular cross-sectional shapes. In particular embodiments, the tubes are provided with a width of six inches to twelve inches. In at least one embodiment, the tubes have a width of eight inches, which demonstrated a significant resistance to warping during charging operations. Many of the features described with respect to charging head 604 may be shared with charging head 324 described above.

Various embodiments of the charging head 604 include a pair of opposing wings 628 and 630 that are shaped to have free end portions 632 and 634. In some embodiments, the free end portions 632 and 634 are positioned in a spaced-apart relationship, forwardly from the charging head plane. In particular embodiments, the free end portions 632 and 634 are spaced forwardly from the charging head plane a distance of six inches to 24 inches, depending on the size of the charging head 604 and the geometry of the opposing wings 628 and 630. In this position, the opposing wings 628 and 630 define open spaces rearwardly from the opposing wings 628 and 630, through the charging head plane. As the design of these open spaces is increased in size, more material is distributed to the sides of the coal bed. As the spaces are made smaller, less material is distributed to the sides of the coal bed. Accordingly, the present technology is adaptable as particular characteristics are presented from coking system to coking system.

In some embodiments, such as depicted in FIGS. 13A-13C, the opposing wings 628 and 660 include first faces 636 and 638 that extend outwardly from the charging head plane. In particular embodiments, the first faces 636 and 638 extend outwardly from the charging plane at a forty-five degree angle. The angle at which the first face deviates from the charging head plane may be increased or decreased according to the particular intended use of the coal charging system 300. For example, particular embodiments may employ an angle of ten degrees to sixty degrees, depending on the conditions anticipated during charging and leveling operations. In some embodiments, the opposing wings 628 and 630 further include second faces 640 and 642 that extend outwardly from the first faces 636 and 638 toward the free distal end portions 632 and 634. In particular embodiments, the second faces 640 and 642 of the opposing wings 628 and 630 reside within a wing plane that is parallel to the charging head plane. In some embodiments, the second faces 640 and 642 are provided to be approximately ten inches in length. In other embodiments, however, the second faces 640 and 642 may have lengths ranging from zero to ten inches, depending on one or more design considerations, including the length selected for the first faces 636 and 638 and the angles at which the first faces 636 and 638 extend away from the charging plane. As depicted in FIGS. 13A-13C, the opposing wings 628 and 630 are shaped to receive loose coal from the rearward face of the charging head 604, while the coal charging system 300 is being withdrawn across the coal bed being charged, and funnel or otherwise direct loose coal toward the side edges of the coal bed. In at least this manner, the coal charging system 300 may reduce the likelihood of voids at the sides of the coal bed. Rather, the wings 628 and 630 help to promote the level coal bed previously described. Testing has shown that use of the opposing wings 628 and 630 can increase the charge weight by one to two tons by filling these side voids. Moreover, the shape of the wings 628 and 630 reduce drag back of the coal and spillage from the pusher side of the oven, which reduces waste and the expenditure of labor to retrieve the spilled coal.

Figure 14:
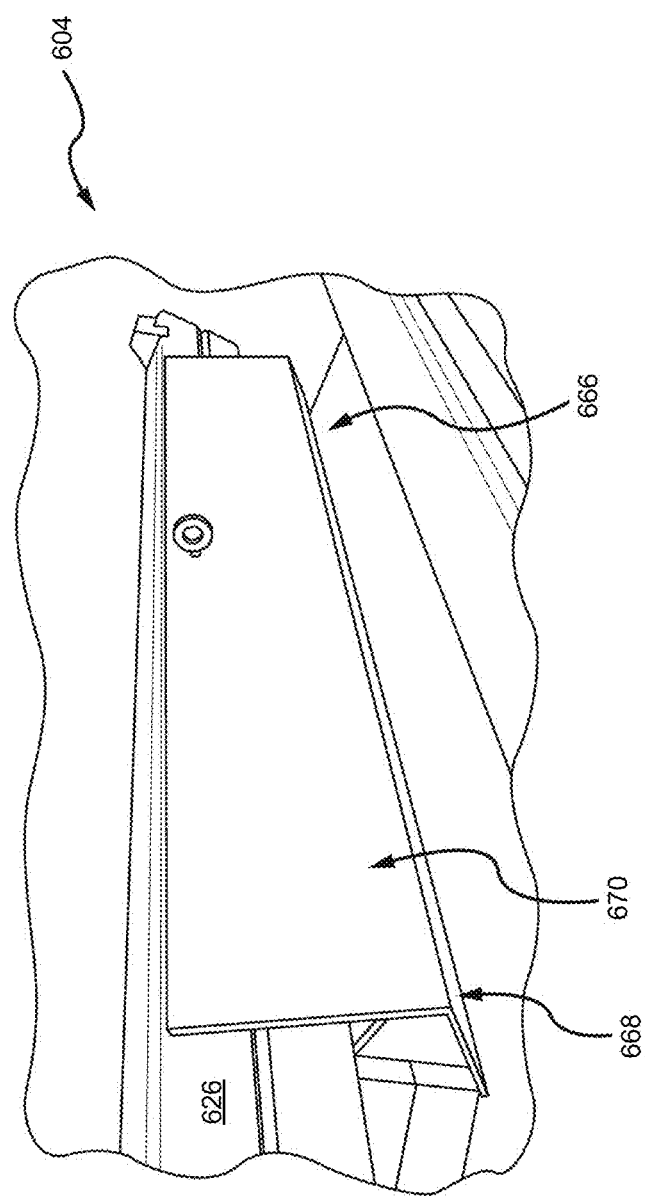
FIG. 14 depicts a front perspective view of one embodiment of an extrusion plate according to the present technology.

With reference to FIG. 14, various embodiments of the present technology position an extrusion plate 666 operatively coupled with the rearward face 626 of the charging head 324. In some embodiments, the extrusion plate 666 includes a coal engagement face 668 that is oriented to face rearwardly and downwardly with respect to the charging head 604. In this manner, loose coal being charged into the oven behind the charging head 604 will engage the coal engagement face 668 of the extrusion plate 666. Due to the pressure of the coal being deposited behind the charging head 604, the coal engagement face 668 compacts the coal downwardly, increasing the coal density of the coal bed beneath the extrusion plate 666. In various embodiments, the extrusion plate 666 extends substantially along a length of the charging head 604 in order to maximize density across a significant width of the coal bed. With continued reference to FIGS. 15 and 16, the extrusion plate 666 further includes an upper deflection face 670 that is oriented to face rearwardly and upwardly with respect to the charging head 604. In this manner, the coal engagement face 668 and the upper deflection face 670 are coupled with one another to define a peak shape, having a peak ridge that faces rearwardly away from the charging head 604. Accordingly, any coal that falls atop the upper deflection face 670 will be directed off the extrusion plate 666 to join the incoming coal before it is extruded.

Figure 15:
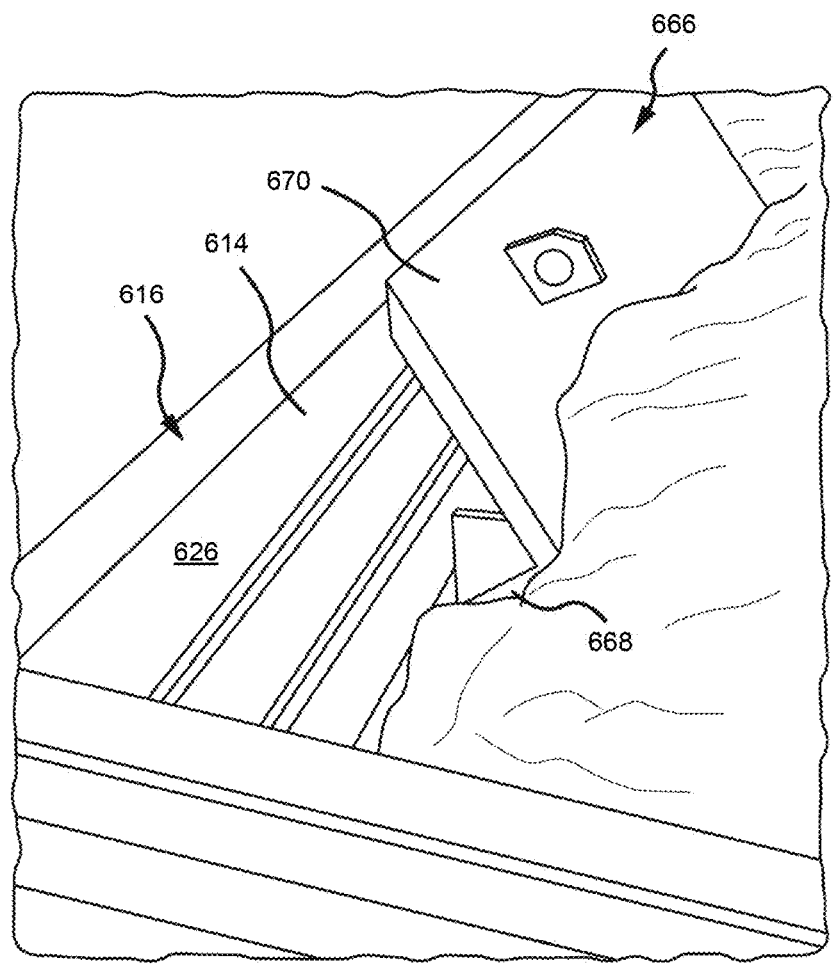
FIG. 15 depicts a side perspective view of one embodiment of an extrusion plate according to the present technology.

In use, coal is shuffled to the front end portion of the coal charging system 300, behind the charging head 604. Coal piles up in the opening between the conveyor and the charging head 604 and conveyor charging pressure starts to build up gradually until reaching approximately 2500 to 2800 psi. With reference to FIG. 15, the coal is fed into the system behind the charging head 604 and the charging head 604 is retracted, rearwardly through the oven. The extrusion plate 666 compacts the coal and extrudes it into the coal bed.

Figure 16:
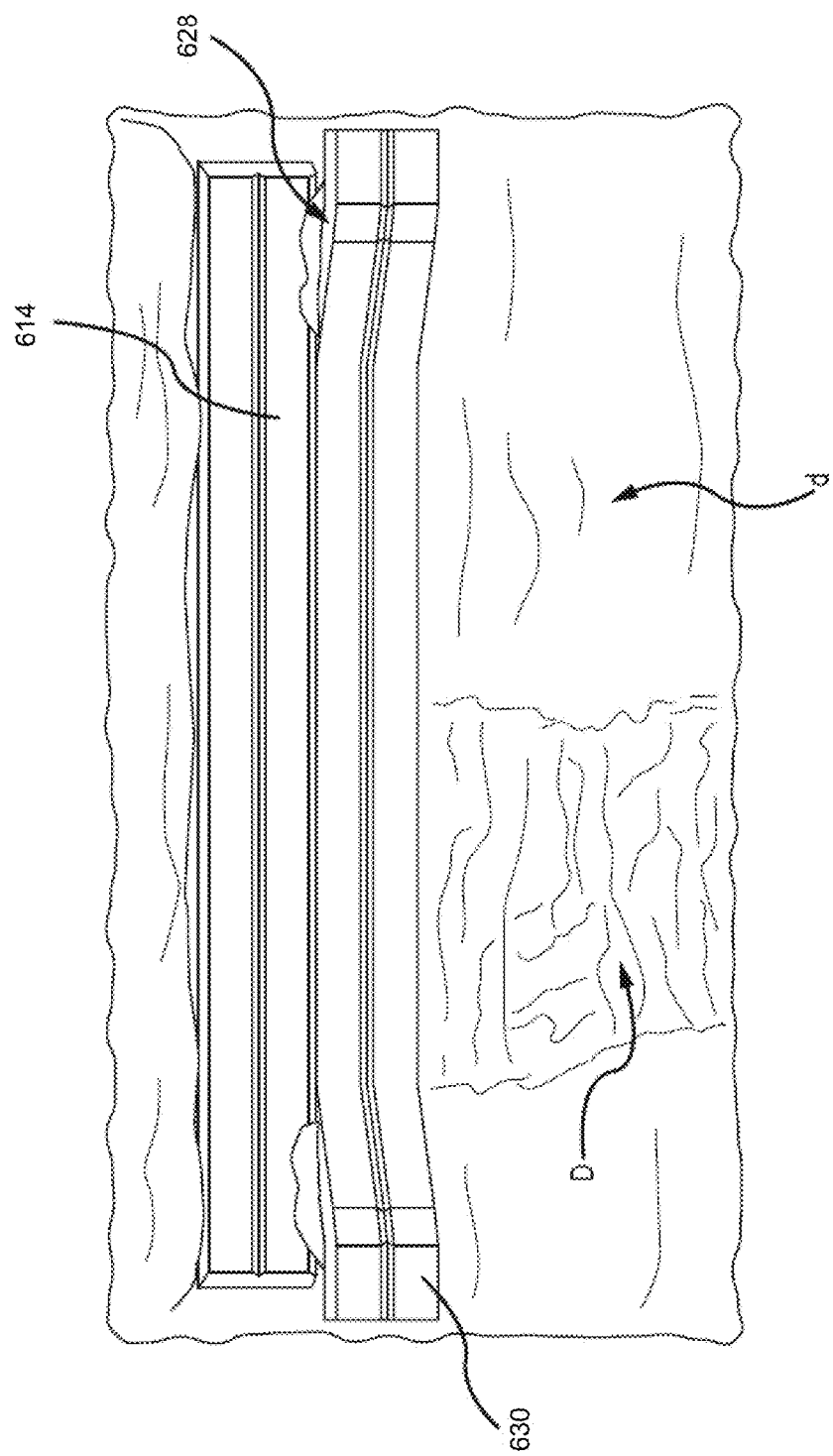
FIG. 16 depicts a front elevation view of one embodiment of a charging head according to the present technology, and further depicts the differences in coal bed densities when an extrusion plate is used and not used in a coal bed charging operation according to the present technology.

FIG. 16 depicts the effect on the density of a coal charge with the benefit of the extrusion plate 666 (left side of the coal bed) and without the benefit of the extrusion plate 666 (right side of the coal bed). As depicted, use of the extrusion plate 666 provides area "D" of increased coal bed bulk density and an area of lesser coal bed bulk density "d" where the extrusion plate is not present. In this manner, the extrusion plate 666 not only demonstrates an improvement in the surface density, but also improves the overall internal bed bulk density.

Figure 17:
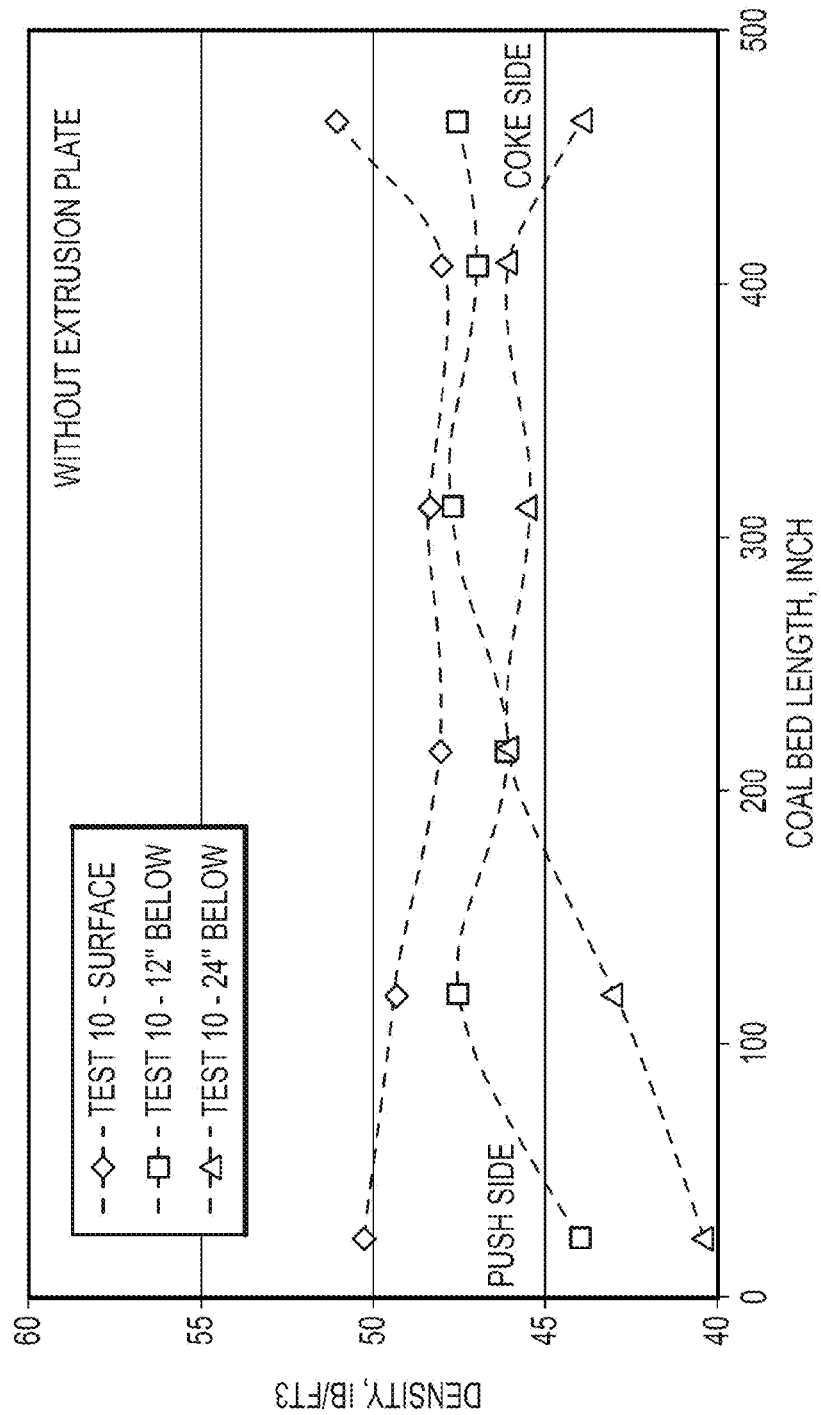
FIG. 17 depicts a plot of coal bed density over a length of a coal bed where the coal bed is charged without the use of an extrusion plate according to the present technology.
Figure 18:
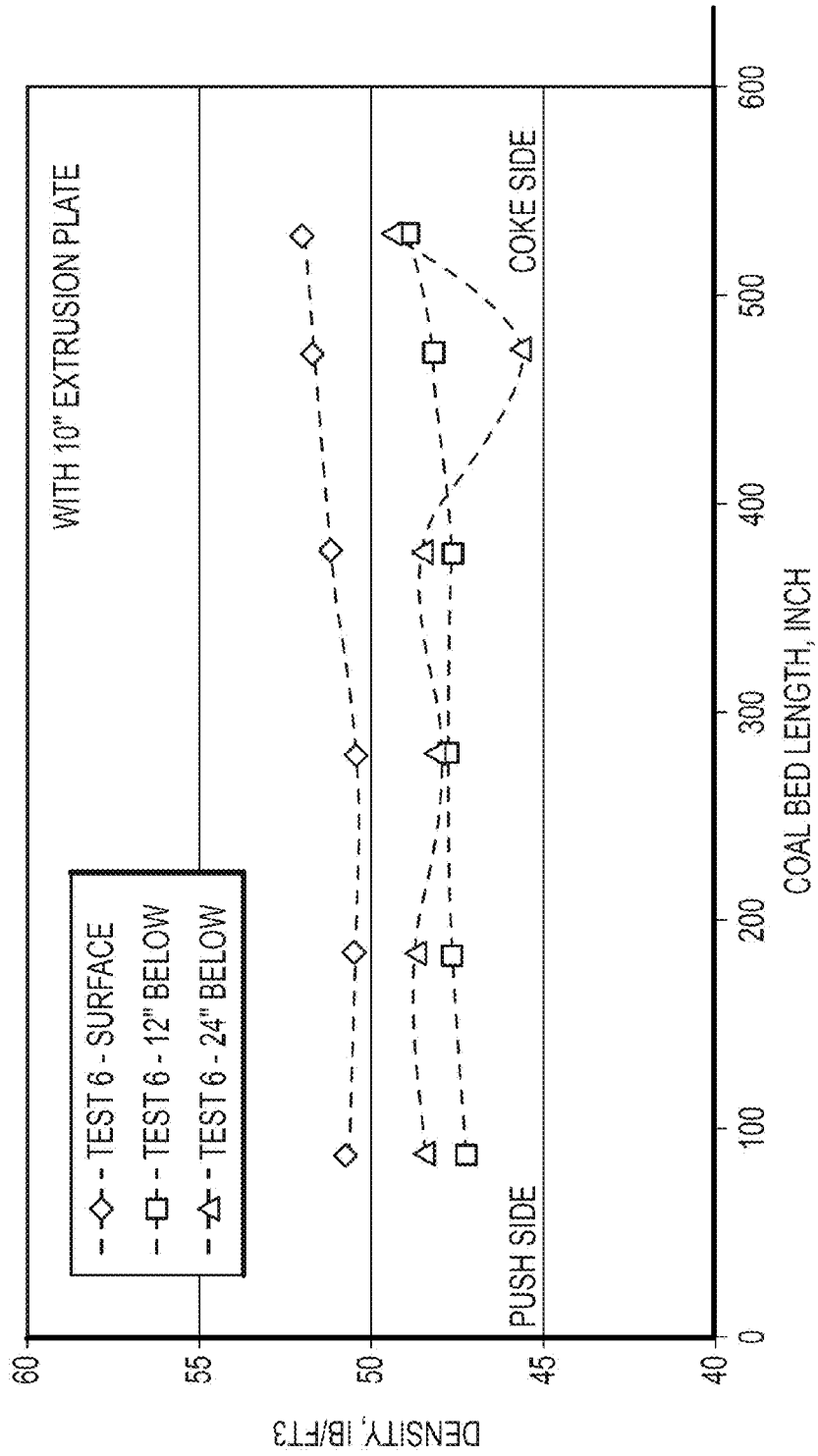
FIG. 18 depicts a plot of coal bed density over a length of a coal bed where the coal bed is charged with the use of an extrusion plate according to the present technology.

The test results, depicted in FIGS. 17 and 18 below, show the improvement of bed density with the use of the extrusion plate 666 (FIG. 18) and without the use of the extrusion plate 666 (FIG. 17). The data demonstrates a significant impact on both surface density and twenty-four inches below the surface of the coal bed. In some testing, an extrusion plate 666 having a ten inch peak (distance from back of the charging head 604 to the peak ridge of the extrusion plate 666, where the coal engagement face 668 and the upper deflection face 670 meet). In other tests, where a six inch peak was used, coal density was increased but not to the levels resulting from the use of the ten inch peak extrusion plate 666. The data reveals that the use of the ten inch peak extrusion plate increased the density of the coal bed, which allowed for an increase in charge weight of approximately two and a half tons. In some embodiments of the present technology, it is contemplated that smaller extrusion plates, of five to ten inches in peak height, for example, or larger extrusion plates, of ten to twenty inches in peak height, for example, could be used.

Although many features of the present technology have been described herein as separate embodiments, these embodiments may also be combined with each other. For example, aspects of the opposing wings 628 and 630, and extrusion plate 666 can be incorporated into those embodiments of the control system 340 described throughout the application.

EXAMPLES

The following Examples are illustrative of several embodiments of the present technology.

1. A coal charging system, the system comprising:
 a coke oven including a pusher side opening, a coke side opening opposite the pusher side opening, opposite side walls, and an oven floor defined by the pusher side opening, the coke side opening, and the opposite side walls;
 a charging ram having a proximal end portion, a distal end portion, and opposite sides that define a length of the charging ram, the charging ram being movable at least from the pusher side opening towards the coke side opening;
 a conveyer system operably coupled to the charging ram and capable of charging coal into the oven, wherein the conveyor system in operation experiences a charging pressure; and
 a control system in communication with the charging ram, wherein the control system is configured to automatically move the charging ram at least between the pusher side opening and the coke side opening, such that the automatic movement of the charging ram is determined at least in part by the chain pressure experienced by the conveyor system.

2. The coal charging system of claim 1, further comprising a locking mechanism configured to hold the charging ram in an initial charging position.

3. The coal charging system of claim 2 wherein the control system is configured to automatically release the locking mechanism and move the charging ram toward the coke side opening after a preset locking charging pressure is reached, and wherein the control system is further configured to maintain an operating chain pressure within a preset operating range.

4. The coal charging system of claim 3 wherein the preset locking charging pressure is greater than 1700 psi.

5. The coal charging system of claim 3 wherein the preset operating range is between 2000-3500 psi.

6. The coal charging system of claim 3 wherein the preset operating range is between 2300-2900 psi.

7. The coal charging system of claim 1 wherein the charging ram movement between the pusher side opening towards the coke side opening is a horizontal movement in a first direction.

8. The coal charging system of claim 7 wherein the charging ram is horizontally movable in a second direction between the opposite side walls of the oven, such that the control system is configured to automatically move the charging ram towards at least one of the opposite side walls of the oven.

9. The coal charging system of claim 1 wherein the charging pressure is a chain pressure.

10. A coal charging system comprising:
a coke oven including a pusher side opening, a coke side opening opposite the pusher side opening, opposite side walls, and an oven floor defined by the pusher side opening, the coke side opening, and the opposite side walls;
a charging ram having a proximal end portion, a distal end portion, and opposite sides that define a length of the charging ram, the charging ram being horizontally movable from the pusher side opening towards the coke side opening and vertically movable away from the oven floor;
a conveyer system operably coupled to the charging ram and capable of charging coal into the oven, wherein the conveyor system in operation experiences a charging pressure; and
a control system in communication with the charging ram, wherein the control system is configured to automatically move the charging ram horizontally toward the coke side opening and vertically away from the oven floor, wherein the automatic movement of the charging ram is determined at least in part by the charging pressure experienced by the conveyor system.

11. The coal charging system of claim 10, further comprising a drive system in communication with the control system, wherein the drive system is operably coupled to the charging ram, and wherein the control system utilizes the drive system at least to vertically move the charging ram in the third direction.

12. The coal charging system of claim 11 wherein the drive system is at least one of a hydraulic drive, electrical drive or screw drive.

13. The coal charging system of claim 10 wherein the charging ram is horizontally movable toward at least one of the opposite side walls of the oven, and wherein the control system is configured to automatically move the charging ram towards at least one of the opposite side walls of the oven.

14. The coal charging system of claim 10, further comprising a scanning system attached to the charging ram and in communication with the control system.

15. The coal charging system of claim 14 wherein the scanning system is configured to scan the oven to determine at least one of an oven floor profile or oven profile.

16. The coal charging system of claim 15 wherein the control system is configured to automatically move the charging ram in the vertical direction away from the oven floor in response to the determined oven floor profile or oven profile.

17. The coal charging system of claim 14 wherein the scanning system is at least one of a camera, laser, or radar.

18. The coal charging system of claim 10 wherein each of the opposite sides of the charging ram includes an interior surface and an exterior surface, the charging ram further comprising:

a plurality of horizontally oriented cross support braces mechanically coupled to the opposite sides of the charging ram; and
a plurality of stiffener plates mechanically coupled to at least a portion of the plurality of cross support braces, wherein each stiffener plate is positioned between the cross support braces and the opposite sides of the charging ram, such that an exterior facing surface of each stiffener plate is adhered to the interior surface of each of the opposite sides of the charging ram and an interior facing surface of each stiffener plate is adhered to one of the cross support braces.

19. The coal charging system of claim 18, further comprising a support member mechanically coupled to the stiffener plate and the cross support brace.

20. The coal charging system of claim 19 wherein the support member is positioned at a lower portion of the cross support brace, and wherein the support member includes first and second surfaces configured approximately normal to each other, the first surface of the support member being connected to the interior facing surface of the stiffener plate and the second surface of the support member being connected to the lower portion of the cross support brace.

21. The coal charging system of claim 18 wherein the plurality of cross support braces are hollow and include a hole opening on a lower portion of the cross support brace, the hole opening being configured to drain fluid from the hole opening.

22. The coal charging system of claim 10 wherein the opposite sides of the charging ram include an upper portion and a lower portion, the coal charging system further comprising:
a first plurality of rollers attached to an upper portion of the opposite sides of the charging ram, and
a second plurality of rollers attached to the lower portion of the opposite sides of the charging ram.

23. The coal charging system of claim 10 wherein the distal end portion the charging ram is configured to penetrate a vertical plane of the pusher side opening of the oven, the coal charging system further comprising:
a vertically oriented charging head operatively coupled with the distal end portion of the charging ram, wherein the charging head includes a planar body residing within a charging head plane, a lower edge portion, an upper edge portion opposite the lower edge portion, a front face, and a rearward face opposite the front face, wherein the rearward face is oriented to face toward the proximal end portion of charging ram; and
an extrusion plate operatively coupled with the rearward face of the charging head, the extrusion plate having a lower coal engagement face that is oriented to face rearwardly and downwardly with respect to the charging head.

24. The coal charging system of claim 23 wherein the extrusion plate further includes an upper deflection face that is oriented to face rearwardly and upwardly with respect to the charging head, the coal engagement face and deflection face being operatively coupled with one another to define a peak ridge facing rearwardly away from the charging head.

25. The coal charging system of claim 23 wherein the control system is configured to maintain an operating charging pressure within a preset operating range between 2000-3500 psi.

26. The coal charging system of claim 10 wherein the distal end portion the charging ram is configured to penetrate a vertical plane of the pusher side opening of the oven, the coal charging system further comprising:

a vertically oriented charging head operatively coupled with the distal end portion of the charging ram, wherein the charging head includes a planar body residing within a charging head plane, a lower edge portion, an upper edge portion opposite the lower edge portion, a front face, and a rearward face opposite the front face, wherein the rearward face is oriented to face toward the proximal end portion of charging ram; and wherein the charging head further includes a pair of opposing wings at the lower end portion of the charging head, each wing having a free end portion positioned in a spaced-apart relationship from the charging head, wherein each of the opposing wings defines an open space that extends from the inner face of the opposing wing through the charging head plane.

27. The coal charging system of claim 26 wherein each wing includes a first face adjacent to the charging head plane and a second face extending from the first face toward the free end portion, wherein the first face is angularly disposed from the charging ram plane toward adjacent sides of charging ram and the second face resides within a wing plane that is parallel to the charging head plane.

28. The coal charging system of claim 10 wherein the charging pressure is a chain pressure.

29. The coal charging system of claim 10, further comprising a plurality of downcommer openings within the oven, wherein each of the downcommer openings faces opposite the oven floor, and wherein the control system is configured to vary coal thickness within the oven to maximize the amount of coal charged into the oven, such that a first thickness of coal adjacent to the downcommer openings is greater a second thickness of coal not adjacent to the downcommer openings.

30. A method for dynamically charging a coal system, the method comprising:
   positioning a charging ram at an initial charging position of a coke oven, wherein the oven includes a pusher side opening, a coke side opening opposite the pusher side opening, opposite side walls, and an oven floor defined by the pusher side opening, coke side opening, and opposite side walls, and wherein the initial charging position is adjacent to the pusher side opening;
   charging coal into the oven at the initial charging position via a conveyer system operably coupled to the charging ram, wherein the conveyer system in operation experiences a charging pressure;
   using a control system, automatically moving the charging ram while simultaneously charging coal into the oven via the conveyer system; and
   maintaining the charging pressure within a preset operating range until the oven is charged.

31. The method of claim 30 wherein automatically moving the charging ram includes both automatically moving the charging ram in a horizontal first direction and a horizontal second direction, wherein the horizontal first direction is along a z-axis toward the coke side opening of the oven, and wherein the horizontal second direction is along an x-axis toward one of the opposite side walls of the oven.

32. The method of claim 30 wherein automatically moving the charging ram further includes automatically moving the charging ram in a vertical third direction along a y-axis away from the oven floor.

33. The method of claim 32, further comprising utilizing a drive system to automatically move the charging ram in the vertical third direction, wherein the drive system includes at least one of a hydraulic drive, electrical drive or screw drive.

34. The method of claim 30 wherein automatically moving the charging ram further includes automatically moving the charging ram in a rotatable fourth direction around the z-axis.

35. The method of claim 30 wherein automatically moving the charging ram further includes automatically moving a proximal end of the charging ram in a rotatable fifth direction around an x-axis, such that when the charging ram is moved in the fifth direction, the charging ram is angled upwards or downwards and the proximal end of the charging ram is lower or higher than a distal end of the charging ram.

36. The method of claim 32 wherein the charging ram further comprises a proximal end portion, a distal end portion and opposite sides that define a length of the charging ram, and wherein the initial charging position includes an initial charging height, the method further comprising:
   maintaining the distal end portion of the charging ram at the initial charging height while moving the charging ram towards the coke side opening.

37. The method of claim 30 wherein the initial charging position includes an initial charging height, and wherein automatically moving the charging ram includes automatically moving the charging ram in a vertical third direction to maintain the initial charging height.

38. The method of claim 30 wherein the fully charged coke oven includes a coal bed having a generally constant thickness.

39. The method of claim 30 wherein the oven further includes a plurality of downcommer openings positioned proximate to the opposite side walls of the oven, the method further comprising:
   charging coal into the oven at a first area to create a first layer of coal having a first thickness; and
   charging coal into the oven at a second area to create a second layer of coal having a second thickness greater than the first thickness;
   wherein the first area is adjacent to at least one of the plurality of downcommer openings and the second area is spaced apart from the plurality of downcommer openings.

40. The method of claim 30 wherein the fully charged coke oven includes a coal bed having a generally uniform density throughout.

41. The method of claim 30, further comprising:
   locking the charging ram in the initial charging position until a preset charging pressure is reached.

42. The method of claim 30, further comprising:
   scanning the oven to determine at least one of an oven profile or an oven floor profile.

43. The method of claim 42, wherein scanning the oven floor occurs before charging coal into the oven at the initial charging position; the method further comprising:
   retracting the charging ram from the oven after the oven is charged; and
   re-scanning the oven after charging the coal into the oven and charging additional coal into the oven.

44. The method of claim 42 wherein scanning the oven floor to determine an oven profile occurs after the oven is fully charged, and wherein the oven profile includes a thickness or height of the charged oven.

45. The method of claim 32, further comprising:
   scanning the oven floor to determine an oven floor profile;
   in response to scanning the oven floor, assigning a location to any carbon material included on the oven profile; and automatically adjusting the charging ram in the vertical third direction.

46. The method of claim 45 wherein automatically adjusting the charging ram includes adjusting the charging ram in the vertical third direction to achieve a generally constant thickness throughout the oven.

47. The method of claim 30 wherein charging coal into the oven at the initial charging position includes charging coal into the oven at an initial charging height, the method further comprising:
automatically adjusting the charging ram in a vertical direction to maintain the initial charging height.

48. The method of claim 30, further comprising:
extruding at least a portion of the coal being charged into the oven by engaging the portions of the coal with an extrusion plate operatively coupled with the charging ram, such that the portions of the coal are compressed beneath a coal engagement face of the extrusion plate.

49. The method of claim 30, further comprising:
retracting the charging ram from the oven after the oven is charged; and
using the control system, automatically moving the charging ram during the retraction in a vertical third direction along a y-axis away from the oven floor.

50. A coal charging system comprising:
a coke oven including a pusher side opening, an coke side opening opposite the pusher side opening, opposite side walls, and an oven floor defined by the pusher side opening, the coke side opening, and the opposite side walls;
a charging ram including a proximal end portion, a distal end portion, and opposite sides that define a length of the charging ram, the charging ram being movable at least between the pusher side opening and the coke side opening, the charging ram further including a conveyer system capable of charging coal into the oven, and
a non-transitory computer-readable medium executable by one or more processors to cause a computer to:
scan the oven to determine at least one of an oven profile;
charge coal into the oven via the charging ram;
in response to the oven profile, automatically move the charging ram while simultaneously charging coal into the oven, wherein the charging ram is (1) horizontally movable along an x-axis, (2) horizontally movable along a z-axis and (3) vertically movable along a y-axis.

51. The coal charging system of claim 50 wherein the oven further includes a plurality of downcommer openings positioned adjacent to the opposite side walls of the oven, and wherein charging coal into the oven results in a thickness of coal within the oven, the one or more processors further causing the computer to:
based on the oven profile of the oven, vary the thickness of coal within the oven to maximize the amount of coal charged into the oven, such that the thickness of coal adjacent to the downcommer openings is greater than the thickness of coal spaced apart from the downcommer openings.

52. A computer-readable medium containing computer-executable instructions for causing a processing device to perform a method for automatically charging a coal system, the method comprising:
receiving a set point corresponding to a desired charging pressure to be maintained by the coal system during charging of the coal system;
receiving a present value of an actual charging pressure corresponding to a pressure transmitted to the processing device from the coal system;
when the present value is above the set point, sending instructions to move the coal system from a first position to a second position that results in the present value dropping below the set point;
when the present value is not above the set point, sending instructions to maintain the coal system in the first position.

We claim:

1. A method for dynamically charging a coal system, the method comprising:
positioning a charging ram at an initial charging position of a coke oven, wherein the oven includes a pusher side opening, a coke side opening opposite the pusher side opening, opposite side walls, and an oven floor defined by the pusher side opening, the coke side opening, and the opposite side walls, and wherein the initial charging position is adjacent to the pusher side opening;
charging coal into the oven at the initial charging position via a conveyer system operably coupled to the charging ram, wherein the conveyer system in operation experiences a charging pressure;
using a control system, automatically moving the charging ram while simultaneously charging coal into the oven via the conveyer system, wherein automatically moving the charging ram is based at least in part on the charging pressure; and
maintaining the charging pressure within a preset operating range until the oven is charged.

2. The method of claim 1, wherein automatically moving the charging ram further includes automatically moving a proximal end of the charging ram in a rotatable fifth direction around an x-axis, such that when the charging ram is moved in the fifth direction, the charging ram is angled upwards or downwards and the proximal end of the charging ram is lower or higher than a distal end of the charging ram.

3. The method of claim 1, wherein the initial charging position includes an initial charging height, and wherein automatically moving the charging ram includes automatically moving the charging ram in a vertical third direction to maintain the initial charging height.

4. The method of claim 1, the method further comprising fullying charging the coke oven, wherein the fully charged coke oven includes a coal bed having a constant thickness.

5. The method of claim 1, wherein the oven further includes a plurality of downcommer openings positioned proximate to the opposite side walls of the oven, the method further comprising:
charging coal into the oven at a first area to create a first layer of coal having a first thickness; and
charging coal into the oven at a second area to create a second layer of coal having a second thickness greater than the first thickness;
wherein the first area is adjacent to at least one of the plurality of downcommer openings and the second area is spaced apart from the plurality of downcommer openings.

6. The method of claim 1, the method further comprising fully charging the coke oven, wherein the fully charged coke oven includes a coal bed having a uniform density throughout.

7. The method of claim 1, further comprising:
locking the charging ram in the initial charging position until a preset charging pressure is reached.

8. The method of claim 1, further comprising:
scanning the oven to determine at least one of an oven profile or an oven floor profile.

9. The method of claim 8, wherein scanning the oven floor occurs before charging coal into the oven at the initial charging position; the method further comprising:
retracting the charging ram from the oven after the oven is charged; and
re-scanning the oven after charging the coal into the oven and charging additional coal into the oven.

10. The method of claim 8, wherein scanning the oven floor to determine an oven profile occurs after the oven is fully charged, and wherein the oven profile includes a height of the charged oven.

11. The method of claim 1, wherein charging coal into the oven at the initial charging position includes charging coal into the oven at an initial charging height, the method further comprising:
automatically adjusting the charging ram in a vertical direction to maintain the initial charging height.

12. The method of claim 1, further comprising:
extruding at least a portion of the coal being charged into the oven by engaging the at least a portion of the coal with an extrusion plate operatively coupled with the charging ram, such that the at least a portion of the coal is compressed beneath a coal engagement face of the extrusion plate.

13. The method of claim 1, further comprising:
retracting the charging ram from the oven after the oven is charged; and
using the control system, automatically moving the charging ram during the retraction in a vertical third direction along a y-axis away from the oven floor.

14. A method of dynamically charging a coal system, the method comprising:
positioning a charging ram at an initial charging position of a coke oven, wherein the oven includes a pusher side opening, a coke side opening opposite the pusher side opening, opposite side walls, and an oven floor defined by the pusher side opening, the coke side opening, and the opposite side walls, and wherein the initial charging position is adjacent to the pusher side opening;
charging coal into the oven at the initial charging position via a conveyer system opeerably coupled to the charging ram, wherein the conveyer system in operation experience a charging pressure;
using a control system, automatically moving the charging ram white simultaneously charging coal into the oven via the conveyer system; and
maintaining the charging pressure within a present operating range until the oven is charged,
wherein automatically moving the charging ram includes automatically moving the charging ram in both a horizontal first direction and a horizontal second direction, wherein the horizontal first direction is along a z-axis toward the coke side opening of the oven, and wherein the horizontal second direction is along an x-axis toward one of the opposite side walls of the oven.

15. A method for dynamically charging a coal system, the method comprising:
positioning a charging ram at an initial charging position of a coke oven, wherein the oven includes a pusher side opening, a coke side opening opposite the pusher side opening, opposite side walls, and an oven floor defined by the pusher side opening, the coke side opening, and the opposite side walls, and wherein the initial charging position is adjacent to the pusher side opening;
charging coal into the oven at the initial charging position via a conveyer system operably coupled to the charging ram, wherein the conveyer system in operation experiences a charging pressure;
using a control system, automatically moving the charging ram while simultaneously charging coal into the oven via the conveyer system, wherein automatically moving the charging ram further includes automatically moving the charging ram in a vertical direction away from the oven floor.

16. The method of claim 15, further comprising utilizing a drive system to automatically move the charging ram in the vertical direction, wherein the drive system includes at least one of a hydraulic drive, an electrical drive or a screw drive.

17. The method of claim 15, wherein automatically moving the charging ram further includes automatically moving the charging ram in a rotatable fourth direction around a z-axis.

18. The method of claim 15 wherein the charging ram comprises a proximal end portion, a distal end portion and opposite sides that define a length of the charging ram, and wherein the initial charging position includes an initial charging height, the method further comprising:
maintaining the distal end portion of the charging ram at the initial charging height while moving the charging ram towards the coke side opening.

19. The method of claim 15, further comprising:
scanning the oven floor to determine an oven floor profile;
in response to scanning the oven floor, assigning a location to any carbon material included on the oven profile; and
automatically adjusting the charging ram in the vertical direction.

20. The method of claim 19, wherein automatically adjusting the charging ram includes adjusting the charging ram in the vertical direction to achieve a generally constant thickness throughout the oven.

* * * * *

UNITED STATES PATENT AND TRADEMARK OFFICE
CERTIFICATE OF CORRECTION

PATENT NO. : 11,214,739 B2
APPLICATION NO. : 16/735103
DATED : January 4, 2022
INVENTOR(S) : Quanci et al.

It is certified that error appears in the above-identified patent and that said Letters Patent is hereby corrected as shown below:

In the Specification

In Column 4, Line 52, delete "suurounding" and insert --surrounding-- therefor.

In Column 8, Line 23, delete "312" and insert --304-- therefor.

In Column 9, Line 17, delete "304." and insert --312.-- therefor.

In Column 9, Line 26, delete "302" and insert --304-- therefor.

In Column 13, Line 52, delete "302" and insert --304-- therefor.

In the Claims

In Column 24, Claim 4, Line 46, delete "fullying" and insert --fully-- therefor.

In Column 25, Claim 14, Line 44, delete "opeerably" and insert --operably-- therefor.

In Column 25, Claim 14, Line 50, delete "present" and insert --preset-- therefor.

In Column 26, Claim 18, Line 33, delete "claim 15" and insert --claim 15,-- therefor.

Signed and Sealed this
Seventh Day of June, 2022

Katherine Kelly Vidal
*Director of the United States Patent and Trademark Office*